US 11,244,192 B2

(12) United States Patent
Ikeda

(10) Patent No.: US 11,244,192 B2
(45) Date of Patent: Feb. 8, 2022

(54) IMAGE JUDGING SYSTEM, IMAGE JUDGING APPARATUS, AND IMAGE JUDGING METHOD

(71) Applicant: Oki Data Corporation, Tokyo (JP)

(72) Inventor: Taro Ikeda, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 217 days.

(21) Appl. No.: 16/744,672

(22) Filed: Jan. 16, 2020

(65) Prior Publication Data

US 2020/0272844 A1   Aug. 27, 2020

(30) Foreign Application Priority Data

Feb. 27, 2019   (JP) ............................. JP2019-034556

(51) Int. Cl.
*G06K 9/46* (2006.01)
*G06T 7/00* (2017.01)
*G06K 9/62* (2006.01)

(52) U.S. Cl.
CPC ............... *G06K 9/46* (2013.01); *G06T 7/001* (2013.01); *G06K 9/6228* (2013.01)

(58) Field of Classification Search
CPC ...... G06K 9/46; G06K 9/6228; G06K 9/2054; G06T 7/001; G06T 2207/10008; G06T 7/0004
See application file for complete search history.

(56) References Cited

U.S. PATENT DOCUMENTS

| 7,916,893 | B2 * | 3/2011 | Kouno | ................. | G06K 9/2063 |
| | | | | | 382/103 |
| 10,002,442 | B1 * | 6/2018 | Dagley | ....................... | G06T 7/73 |
| 10,973,412 | B1 * | 4/2021 | James, Jr. | .............. | A61B 5/445 |
| 2002/0026289 | A1 * | 2/2002 | Kuzunuki | ............... | H04L 67/04 |
| | | | | | 702/150 |
| 2007/0172122 | A1 * | 7/2007 | Kouno | ................. | G06K 9/2063 |
| | | | | | 382/175 |
| 2009/0214082 | A1 * | 8/2009 | Hoshi | ................ | H04N 1/00244 |
| | | | | | 382/106 |
| 2010/0293224 | A1 * | 11/2010 | Moriwaki | ............... | G06F 16/29 |
| | | | | | 709/203 |

(Continued)

FOREIGN PATENT DOCUMENTS

JP        2017-132126 A      8/2017

*Primary Examiner* — Aaron W Carter
(74) *Attorney, Agent, or Firm* — Rabin & Berdo, P.C.

(57) ABSTRACT

An image judging system includes a server and a mobile terminal performing communication therewith. The server includes a position calculating unit that calculates positions of an image of interest and a first landmark image corresponding thereto of a judging target image in whole image data obtained on the basis of a judging target image. The mobile terminal includes: a display unit displaying the image data and the guide mark together; and an imaging unit capturing an image of the judging target image, thereby generating image data, and generating image data related to the judging target image. The server or the mobile terminal includes a guide information generating unit calculating a position of a guide mark on the basis of a position of the detected first landmark image in the image data and a positional relationship between the image of interest and the first landmark image in the whole image data.

15 Claims, 14 Drawing Sheets

(56) References Cited

U.S. PATENT DOCUMENTS

| | | | |
|---|---|---|---|
| 2015/0029214 A1* | 1/2015 | Kumagai | G06T 19/006 345/625 |
| 2016/0156840 A1* | 6/2016 | Arai | H04N 5/232933 348/77 |
| 2020/0272844 A1* | 8/2020 | Ikeda | G06T 7/0004 |

* cited by examiner

IMAGE JUDGING SYSTEM, IMAGE JUDGING APPARATUS, AND IMAGE JUDGING METHOD

CROSS REFERENCE TO RELATED APPLICATIONS

The present application claims priority from Japanese Patent Application No. 2019-034556 filed on Feb. 27, 2019, the entire contents of which are hereby incorporated by reference.

BACKGROUND

The technology relates to an image judging system that judges an image formed by an image forming apparatus, to an image judging apparatus, and to an image judging method.

Some image forming apparatuses maintain quality of a formed image by adjusting an image formation condition. For example, Japanese Unexamined Patent Application Publication No. 2017-132126 discloses an image forming apparatus that receives an image of a color chart from an external device and adjusts a color print density on the basis of the received image.

SUMMARY

It is desired for an image forming apparatus to have high quality in a formed image, and further improvement in image quality is expected.

It is desirable to provide an image judging system, an image judging apparatus, and an image judging method that allow for improvement in image quality.

According to one embodiment of the technology, there is provided an image judging system that includes a server and a mobile terminal. The mobile terminal performs communication between the server and the mobile terminal. The server includes a position calculating unit that calculates a position of an image of interest in a whole image data and a position of a first landmark image in the whole image data. The whole image data is obtained on the basis of a judging target image. The judging target image is provided on a recording medium and includes a plurality of landmark images and the image of interest. The first landmark image is one, of the landmark images, corresponding to the image of interest. The mobile terminal includes an imaging unit that captures an image of the judging target image and thereby generates image data. The server or the mobile terminal includes a guide information generating unit that detects the first landmark image in the image data, and calculates a position of a guide mark on the basis of a positional relationship and a position of the first landmark image in the image data. The positional relationship is a positional relationship between the image of interest in the whole image data and the first landmark image in the whole image data. The guide mark is to be disposed in the image data and relative to the image of interest. The mobile terminal includes a display unit that displays the image data and the guide mark together. The imaging unit generates related image data after the display unit displays the guide mark. The related image data is related to the judging target image.

According to one embodiment of the technology, there is provided an image judging apparatus that includes a position calculating unit, an imaging unit, a guide information generating unit, and a display unit. The position calculating unit calculates a position of an image of interest in a whole image data and a position of a first landmark image in the whole image data. The whole image data is obtained on the basis of a judging target image. The judging target image is provided on a recording medium and includes a plurality of landmark images and the image of interest. The first landmark image is one, of the landmark images, corresponding to the image of interest. The imaging unit captures an image of the judging target image and thereby generates image data. The guide information generating unit detects the first landmark image in the image data, and calculates a position of a guide mark on the basis of a positional relationship and a position of the first landmark image in the image data. The positional relationship is a positional relationship between the image of interest in the whole image data and the first landmark image in the whole image data. The guide mark is to be disposed in the image data and relative to the image of interest. The display unit displays the image data and the guide mark together. The imaging unit generates related image data after the display unit displays the guide mark. The related image data is related to the judging target image.

According to one embodiment of the technology, there is provided an image judging method including: calculating a position of an image of interest in a whole image data and a position of a first landmark image in the whole image data, the whole image data being obtained on the basis of a judging target image, the judging target image being provided on a recording medium and including a plurality of landmark images and the image of interest, the first landmark image being one, of the landmark images, corresponding to the image of interest; capturing an image of the judging target image and thereby generating image data; detecting the first landmark image in the image data; calculating a position of a guide mark on the basis of a positional relationship and a position of the first landmark image in the image data, the positional relationship being a positional relationship between the image of interest in the whole image data and the first landmark image in the whole image data, the guide mark being to be disposed in the image data and relative to the image of interest; displaying the image data and the guide mark together; and generating related image data after the displaying of the guide mark, the related image data being related to the judging target image.

DETAILED DESCRIPTION

Figure 1:
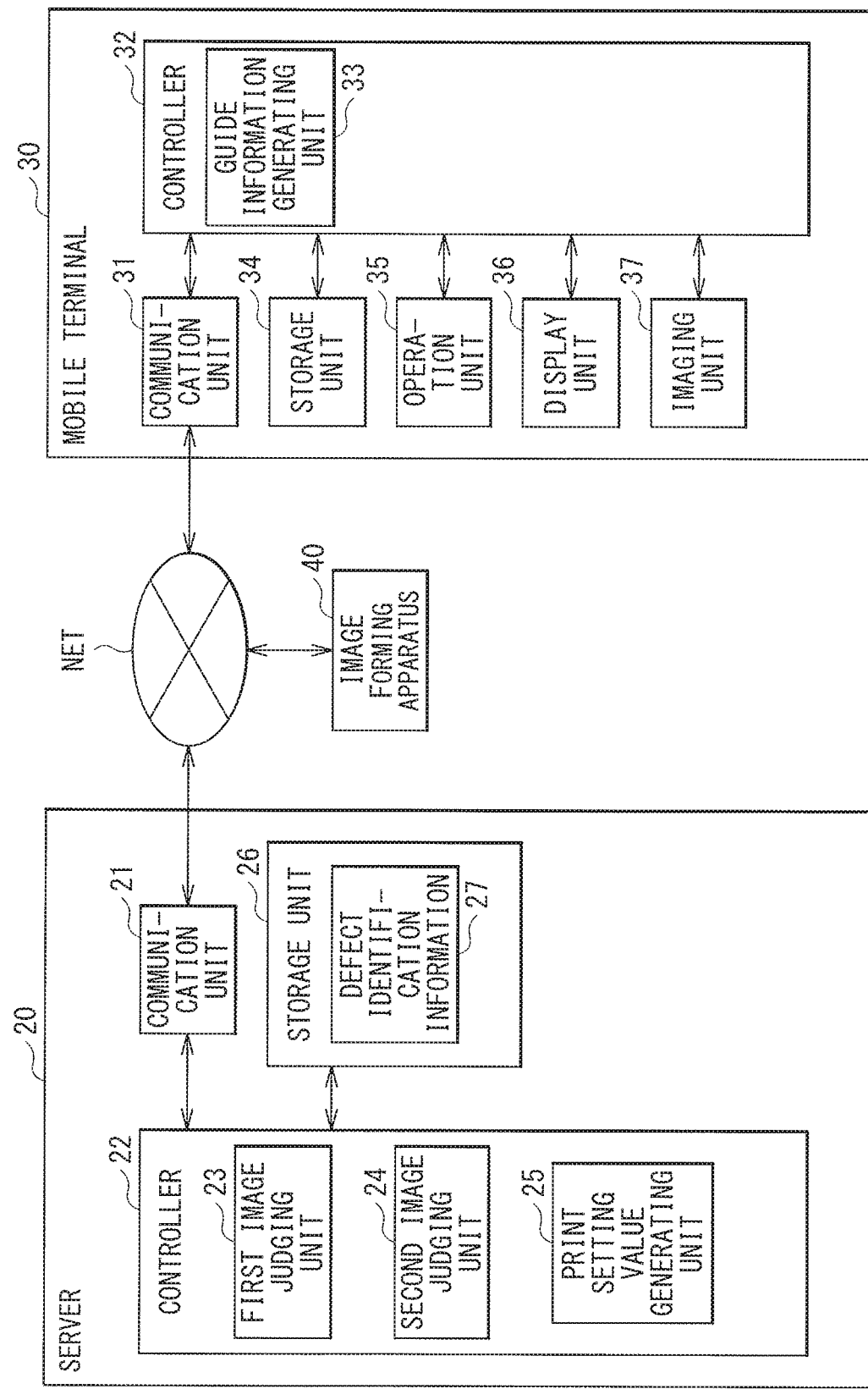
FIG. 1 is a block diagram illustrating an example of a configuration of an image judging system according to an example embodiment of the technology.

Hereinafter, some example embodiments of the technology will be described in detail with reference to the drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the technology are optional and may be provided on an as-needed basis. The drawings are schematic and are not intended to be drawn to scale. Note that the like elements are denoted with the same reference numerals, and any redundant description thereof will not be described in detail.

EXAMPLE EMBODIMENT

Configuration Example

FIG. 1 illustrates an example of a configuration of an image judging system (an image judging system 1) according to an example embodiment of the technology. An image judging method according to an example embodiment of the technology is implemented by the example embodiment described hereinafter and is therefore described together. The image judging system 1 includes a server 20 and a mobile terminal 30, and may further include an image forming apparatus 40.

The server 20, the mobile terminal 30, and the image forming apparatus 40 may be coupled to a network NET such as the Internet. The server 20 may be coupled to the network NET via, for example but not limited to, a wired local area network (LAN) or a wireless LAN. The image forming apparatus 40 may be coupled to the network NET via, for example but not limited to, a LAN or a wireless LAN. The mobile terminal 30 may be coupled to the network NET via, for example but not limited to, long term evolution (LET) or a wireless LAN. This configuration may allow the server 20, the mobile terminal 30, and the image forming apparatus 40 to perform communication with each other.

In the image judging system 1, in order to judge image quality of the image forming apparatus 40, first, the image forming apparatus 40 may perform image forming operation to thereby form a judging chart DC on a recording medium such as paper.

Figure 2A:
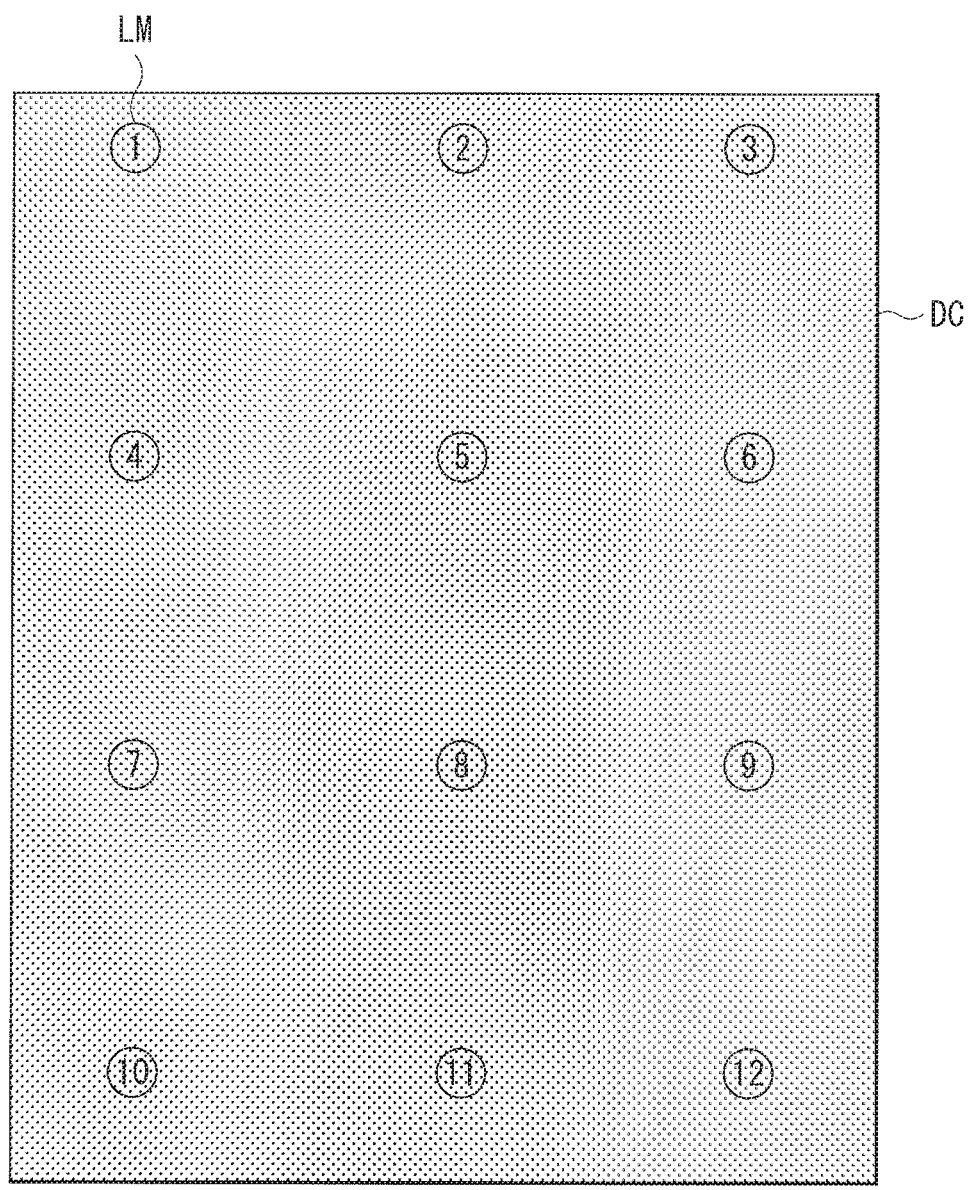
FIG. 2A is an explanatory diagram illustrating an example of a judging chart.

FIG. 2A illustrates an example of the judging chart DC. A hatched portion in FIG. 2A indicates that the corresponding portion is filled in black in this example. The judging chart DC includes a plurality of landmark images LM. In the example described below, each of the landmark images LM may have a predetermined size and include number. In the example described below, the landmark images LM may be disposed at twelve positions in the judging chart DC with predetermined intervals. Each of the landmark images LM may include one of the numbers different from each other, e.g., the numbers from "1" to "12", in accordance with its disposed position in the judging chart DC. The landmark images LM may be used to identify a position having a defect in an image, as will be described later. The landmark images LM may include the respective numbers in this example; however, this is non-limiting. In another example, the landmark images LM may include respective characters. In still another example, the landmark images LM may include respective symbols.

Figure 2B:
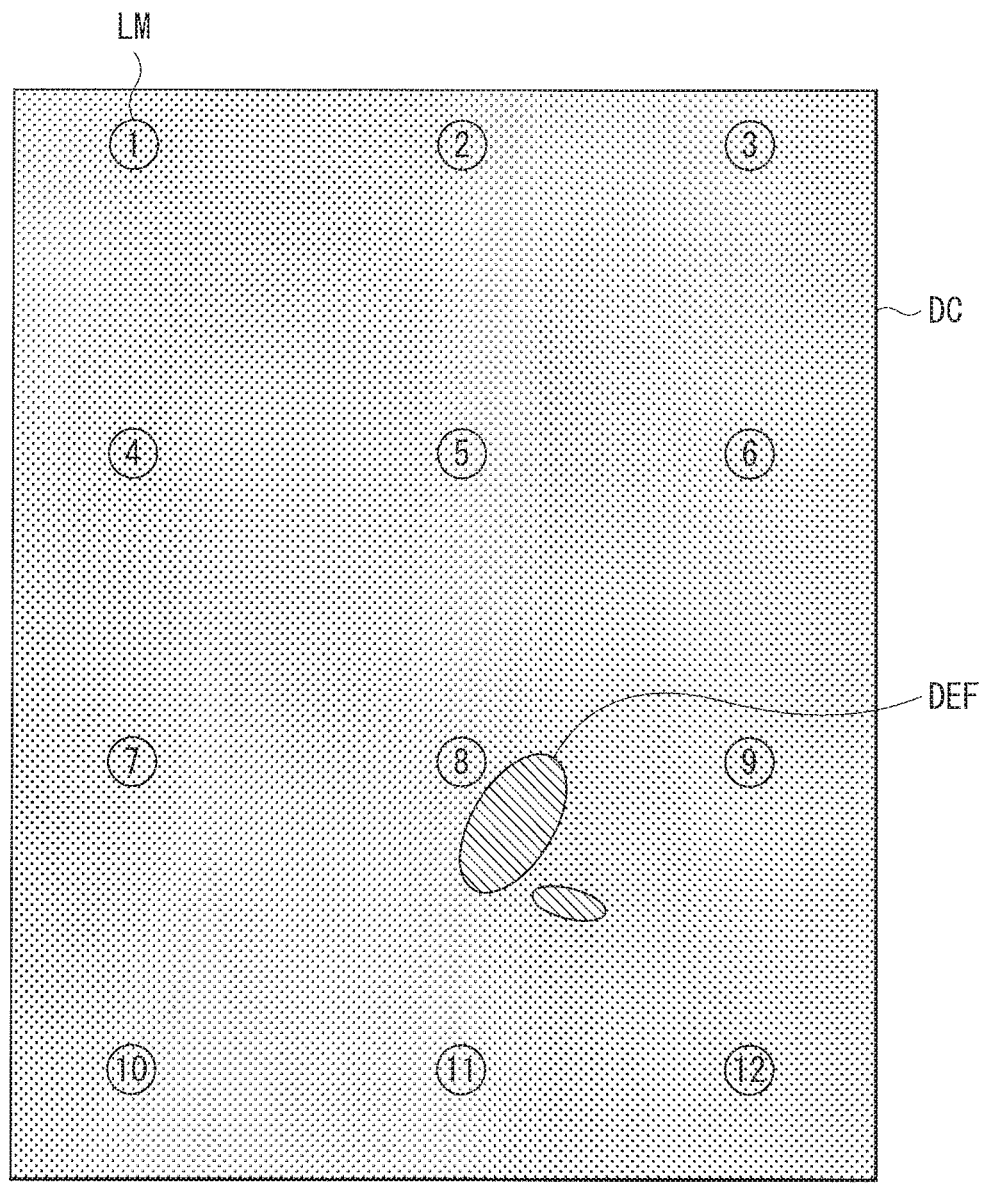
FIG. 2B is another explanatory diagram illustrating an example of the judging chart.

FIG. 2B illustrates another example of the judging chart DC. In the example illustrated in FIG. 2B, the image may have a defect and the judging chart DC may include a defect image DEF. The defect image DEF may be provided on the lower right of the landmark image LM with the number "8" in this example.

In the image judging system 1, the mobile terminal 30 may capture, on the basis of operation performed by a user, an image of the whole judging chart DC formed on the recording medium, and thereby generate judging image data A. The server 20 may judge whether the image has a defect on the basis of the judging image data A. In a case where an image has a defect as illustrated in FIG. 2B, the mobile terminal 30 may capture an enlarged image of the defect image DEF in the judging chart DC on the basis of operation performed by the user, and thereby generate judging image data B. On this occasion, the mobile terminal 30 may identify a position of the defect image DEF and a size of the defect image DEF on the basis of the landmark images LM, and prompt the user to capture an enlarged image of the defect image DEF. That is, in this example, attention may be paid to the defect image DEF, and an image of the defect image DEF may be captured. The server 20 may judge a type of the defect on the basis of the judging image data B, and generate a print setting value PS on the basis of a result of the judgement. The print setting value PS may be a value that allows for improvement of the defect. The image forming apparatus 40 may update an image formation condition on the basis of the print setting value PS. The image judging system 1 thereby allows for improvement in image quality.

The server 20 may include, for example but not limited to, a communication unit 21, a controller 22, and a storage unit 26.

The communication unit 21 may be configured to perform communication between the communication unit 21 and each of the mobile terminal 30 and the image forming apparatus 40 via the network NET, for example. In this example, the communication unit 21 may receive, from the mobile terminal 30, the judging image data A representing the whole image of the judging chart DC and the judging image data B representing the enlarged image of the defect image DEF in the judging chart DC. The communication unit 21 may transmit defect image data DI and defect attribute information ATR to the mobile terminal 30, and transmit the print setting value PS to the image forming apparatus 40. The defect image data DI and the defect attribute information ATR will be described later.

The controller 22 may control general operation of the server 20 by controlling operation of each block in the server 20. The controller 22 may include, for example but not limited to, a processor that is able to execute a program and a random-access memory (RAM). The controller 22 may include a first image judging unit 23, a second image judging unit 24, and a print setting value generating unit 25.

The first image judging unit 23 may judge the judging image data A received by the communication unit 21. In a specific but non-limiting example, the first image judging unit 23 may judge the defect image DEF that is most defective in the judging image data A representing the whole image of the judging chart DC. Further, the first image judging unit 23 may calculate a position of the defect image DEF in the judging image data A, a size of the defect image DEF in the judging image data A, and a position of a landmark image LM corresponding to the defect image DEF in the judging image data A. The landmark image LM corresponding to the defect image DEF may be referred to as a landmark image LM1. The first image judging unit 23 may generate the defect image data DI on the basis of the defect image DEF, and generate the defect attribute information ATR on the basis of the position of the defect image DEF in the judging image data A, the size of the defect image DEF in the judging image data A, and the position of the landmark image LM1 in the judging image data A.

The second image judging unit 24 may judge the judging image data B received by the communication unit 21. In a specific but non-limiting example, the second image judging unit 24 may judge which type of defect the defect image DEF is classified into, on the basis of the judging image data B representing the enlarged image of the defect image DEF, with the use of defect identification information 27 stored in the storage unit 26. The defect identification information 27 will be described later.

The print setting value generating unit 25 may generate the print setting value PS on the basis of the later-described defect identification information 27 stored in the storage unit 26. The print setting value PS may be a value that allows for improvement of a defect in the image forming apparatus 40 that has formed the judging chart DC. The print setting value generating unit 25 may generate setting values of various image formation parameters such as a fixing temperature or various application voltages, for example.

The storage unit 26 may hold various programs, various settings, and various pieces of data such as image data to be used in the server 20. The storage unit 26 may include, for example but not limited to, a non-volatile memory. The storage unit 26 may hold the defect identification information 27.

The defect identification information 27 may include, for example but not limited to, information related to a type of a defect, information related to a feature of a defect image corresponding to the type of defect, and information related to a setting value of an image formation parameter that allows for improvement of the defect. Non-limiting examples of the types of the defects may include a print defect of a faint color, a print defect of a void, and registration displacement, i.e., a print defect of a low-density portion. In a non-limiting example, the defect identification information 27 may be generated by an unillustrated apparatus that performs machine learning. For example, the machine learning apparatus may extract features from various defect image samples and perform classification of the types of the defects with the use of the extracted features to generate the defect identification information 27. The second image judging unit 24 may be configured to judge, with the use of the defect identification information 27, which type of defect the defect image DEF corresponds to. The print setting value generating unit 25 may generate, with the use of the defect identification information 27, the print setting value PS that allows for improvement of the defect.

The mobile terminal 30 may be, for example but not limited to, a smartphone or a tablet terminal. The mobile terminal 30 may include a communication unit 31, a controller 32, a storage unit 34, an operation unit 35, a display unit 36, and an imaging unit 37.

The communication unit 31 may perform communication between the communication unit 31 and each of the server 20 and the image forming apparatus 40 via the network NET, for example. In this example, the communication unit 31 may transmit, to the server 20, the judging image data A representing the whole image of the judging chart DC and the judging image data B representing the enlarged image of the defect image DEF in the judging chart DC. The communication unit 31 may receive the defect image data DI and the defect attribute information ATR from the server 20.

The controller 32 may control general operation of the mobile terminal 30 by controlling operation of each block in the mobile terminal 30. The controller 32 may include a processor that is able to execute a program and a RAM. The controller 32 may include a guide information generating unit 33.

The guide information generating unit 33 may generate a guide mark M1, an aiming mark M2, and operation instruction information NAVI on the basis of present captured image data IMG1 generated by the imaging unit 37 and the defect attribute information ATR received by the communication unit 31. The guide mark M1, the aiming mark M2, and the operation instruction information NAVI may be displayed on the display unit 36. The guide mark M1 may be disposed at the position of the defect image DEF. The aiming mark M2 may indicate a position to dispose the guide mark M1 in order to capture an enlarged image of the defect image DEF, as will be described later. The operation instruction information NAVI may be message information that prompts the user to capture an enlarged image of the defect image DEF. In one example, the operation instruction information NAVI may include text information to be displayed on the display unit 36. The operation instruction information NAVI is, however, not limited to the text information. In one example, the operation instruction information NAVI may include an animation to be displayed on the display unit 36. In another example, the operation instruction information NAVI may include audio information containing an operation instruction for the user.

The storage unit 34 may hold various programs, various settings, and various pieces of data such as image data to be used in the mobile terminal 30. The storage unit 34 may include, for example but not limited to, a non-volatile memory.

The operation unit 35 may receive operation performed by the user. The operation unit 35 may include, for example but not limited to, various buttons, a touch panel, and any other suitable device.

The display unit 36 may display, for example but not limited to, an operation state of the mobile terminal 30, captured image data, or any other suitable data. The display unit 36 may include, for example but not limited to, a liquid crystal display and various indicators.

The imaging unit 37 may capture an image. The imaging unit 37 may include, for example but not limited to, an optical lens, a complementary metal oxide semiconductor (CMOS) imaging device, or any other suitable device.

The image forming apparatus 40 may be, for example but not limited to, a printer. The image forming apparatus 40 may perform image forming operation with the use of a developer such as a toner and thereby form an image such as a monochrome image or a color image on a recording medium such as paper.

The judging chart DC may correspond to a "judging target image" in one specific but non-limiting embodiment of the technology. The defect image DEF may correspond to an "image of interest" in one specific but non-limiting embodiment of the technology. The judging image data A may correspond to "whole image data" in one specific but non-limiting embodiment of the technology. The first image judging unit 23 may correspond to a "position calculating unit" in one specific but non-limiting embodiment of the technology. The present captured image data IMG1 may correspond to "image data" in one specific but non-limiting embodiment of the technology. The guide information generating unit 33 may correspond to a "guide information generating unit" in one specific but non-limiting embodiment of the technology. The judging image data B may correspond to "related image data" in one specific but non-limiting embodiment of the technology. The second image judging unit 24 and the print setting value generating unit 25 may correspond to an "image judging unit" in one specific but non-limiting embodiment of the technology.

Example Operation and Example Workings

A description is given next of example operation and example workings of the image judging system 1 according to the example embodiment.

Overview of General Operation

An overview of general operation of the image judging system 1 is described first with reference to FIG. 1. First, the imaging unit 37 of the mobile terminal 30 may capture an image of the whole judging chart DC on the basis of operation performed by the user, and thereby generate the judging image data A. The judging chart DC may be formed on the recording medium such as paper by the image forming apparatus 40.

The first image judging unit 23 of the server 20 may perform judging on the basis of the judging image data A representing the whole image of the judging chart DC, and thereby generate the defect image data DI and the defect attribute information ATR. The guide information generating unit 33 of the mobile terminal 30 may generate the guide mark M1, the aiming mark M2, and the operation instruction information NAVI on the basis of the defect attribute information ATR. The display unit 36 may display the guide mark M1, the aiming mark M2, and the operation instruction information NAVI, and thereby prompt the user to capture an enlarged image of the defect image DEF of the judging chart DC. The imaging unit 37 of the mobile terminal 30 may capture an enlarged image of the defect image DEF in the judging chart DC, and thereby generate the judging image data B. The second image judging unit 24 of the server 20 may judge the type of defect on the basis of the judging image data B representing the enlarged image of the defect image DEF in the judging chart DC and with the use of the defect identification information 27 stored in the storage unit 26. The print setting value generating unit 25 may generate the print setting value PS that allows for improvement of the defect, on the basis of a result of the judging. The image forming apparatus 40 may update the image formation condition on the basis of the print setting value PS.

Detailed Operation

Figure 3:
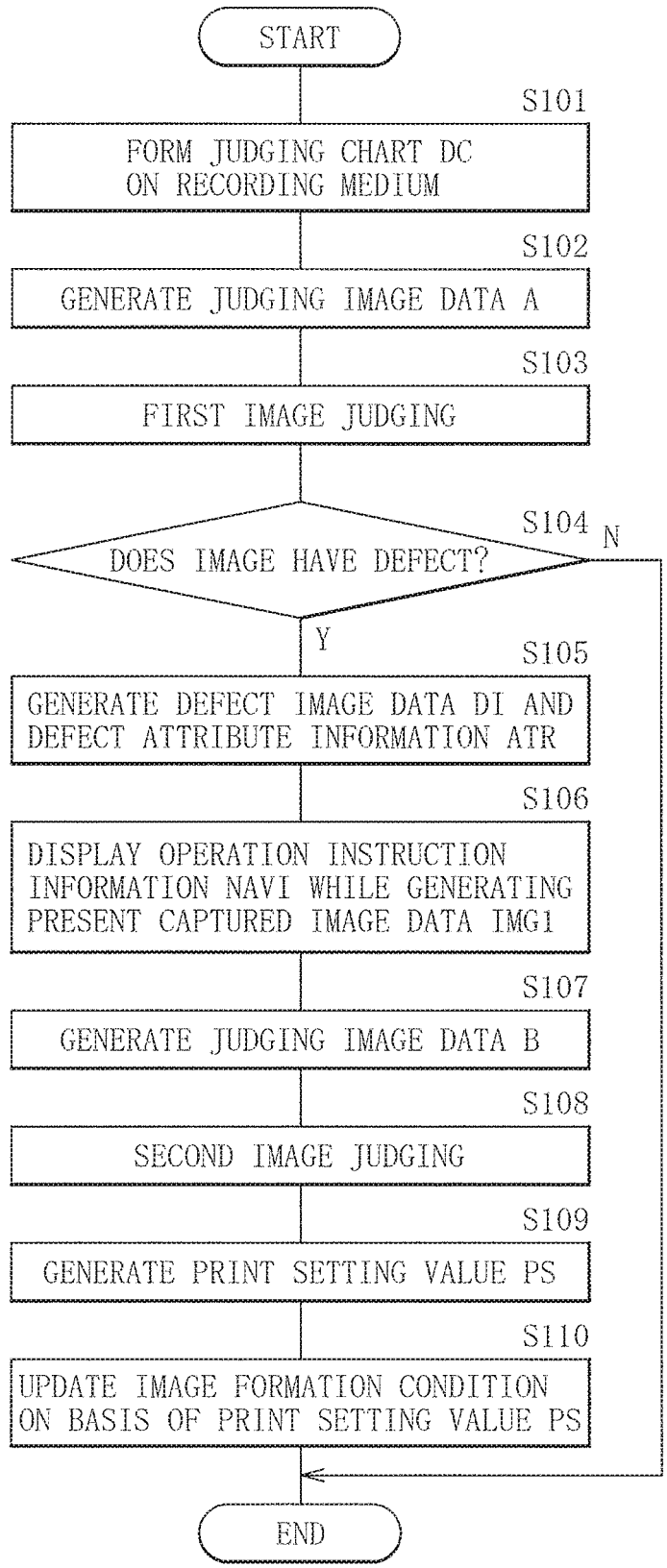
FIG. 3 is a flowchart illustrating an example of operation of an image judging system illustrated in FIG. 1.

FIG. 3 illustrates an example of operation of the image judging system 1. First, the image forming apparatus 40 may form the judging chart DC on the recording medium such as paper (step S101). In a specific but non-limiting example, the image forming apparatus 40 may form the judging chart DC on the recording medium on the basis of predetermined judging chart data transmitted from the mobile terminal 30. The predetermined judging chart data may include a plurality of landmark images LM. In a case where the image formed by the image forming apparatus 40 has no defect, for example, the judging chart DC illustrated in FIG. 2A may be obtained. In a case where the image formed by the image forming apparatus 40 has a defect, for example, the judging chart DC illustrated in FIG. 2B may be obtained.

Thereafter, the imaging unit 37 of the mobile terminal 30 may so capture an image that the whole judging chart DC is included in an imaging range, and thereby generate the judging image data A (step S102). The communication unit 31 of the mobile terminal 30 may transmit the judging image data A to the server 20 via the network NET. The communication unit 21 of the server 20 may receive the judging image data A.

Thereafter, the first image judging unit 23 of the server 20 may perform first image judging on the basis of the judging image data A (step S103). The first image judging unit 23 may determine whether the image has a defect by means of the first image judging (step S104). In a case where the image does not have any defect ("NO" in step S104), the process may be brought to an end. In this case, the server 20 may notify the mobile terminal 30 of absence of the defect, and the display unit 36 of the mobile terminal 30 may display information indicating the absence of the defect, for example.

In a case where the image has a defect in step S104 ("YES" in step S104), the first image judging unit 23 of the server 20 may generate the defect image data DI and the defect attribute information ATR (step S105). In a specific but non-limiting example, the first image judging unit 23 may detect the defect image DEF that is most defective in the judging image data A representing the whole image of the judging chart DC. Further, the first image judging unit 23 may calculate the position of the defect image DEF, the size of the defect image DEF, and the position of the landmark image LM1 corresponding to the defect image DEF. Further, the first image judging unit 23 may generate the defect image data DI on the basis of the defect image DEF, and generate the defect attribute information ATR on the basis of information related to the position of the defect image DEF in the judging image data A, the size of the defect image DEF in the judging image data A, and the position of the landmark image LM1. The communication unit 21 of the server 20 may transmit the defect image data DI and the defect attribute information ATR to the mobile terminal 30 via the network NET. The communication unit 31 of the mobile terminal 30 may receive the defect image data DI and the defect attribute information ATR.

Thereafter, the mobile terminal 30 may display the guide mark M1, the aiming mark M2, and the operation instruction information NAVI while generating the present captured image data IMG1 (step S106). In a specific but non-limiting example, the imaging unit 37 may capture an image of the judging chart DC formed on the recording medium and thereby generate the present captured image data IMG1. Further, the guide information generating unit 33 may generate the guide mark M1, the aiming mark M2, and the operation instruction information NAVI on the basis of the defect attribute information ATR. Further, the display unit 36 may display the guide mark M1, the aiming mark M2, and the operation instruction information NAVI. In one example, the user may so vary a posture of the mobile terminal 30 that the imaging unit 37 is allowed to capture an enlarged image of the defect image DEF, on the basis of an instruction displayed on the display unit 36. In another example, the user may so operate the operation unit 35 of the mobile terminal 30 on the basis of an instruction displayed on the display unit 36. In a specific but non-limiting example, the user may bring the mobile terminal 30 closer to the recording medium formed with the judging chart DC, or perform gesture operation such as pinch-in or pinch-out on the operation unit 35, as will be described later.

Thereafter, the imaging unit 37 of the mobile terminal 30 may capture an enlarged image of the defect image DEF in the judging chart DC, and thereby generate the judging image data B representing the enlarged image of the defect image DEF (step S107). The communication unit 31 of the mobile terminal 30 may transmit the judging image data B to the server 20 via the network NET. The communication unit 21 of the server 20 may receive the judging image data B.

Thereafter, the second image judging unit 24 of the server 20 may perform second image judging on the basis of the judging image data B (step S108). In a specific but non-limiting example, the second image judging unit 24 may judge which type of defect is present, on the basis of the judging image data B and with the use of the defect identification information 27 stored in the storage unit 26.

Thereafter, the print setting value generating unit 25 of the server 20 may generate the print setting value PS which the image forming apparatus 40 is to set, on the basis of a result of the second image judging performed by the second image judging unit 24 and with the use of the defect identification information 27 stored in the storage unit 26 (step S109). The communication unit 21 of the server 20 may transmit the print setting value PS to the image forming apparatus 40 via the network NET. The image forming apparatus 40 may receive the print setting value PS.

Thereafter, the image forming apparatus 40 may update the image formation condition on the basis of the print setting value PS (step S110).

This may bring the process to an end.

A detailed description is given next of operation in a case where the image formed by the image forming apparatus 40 includes a defect.

Figure 4:
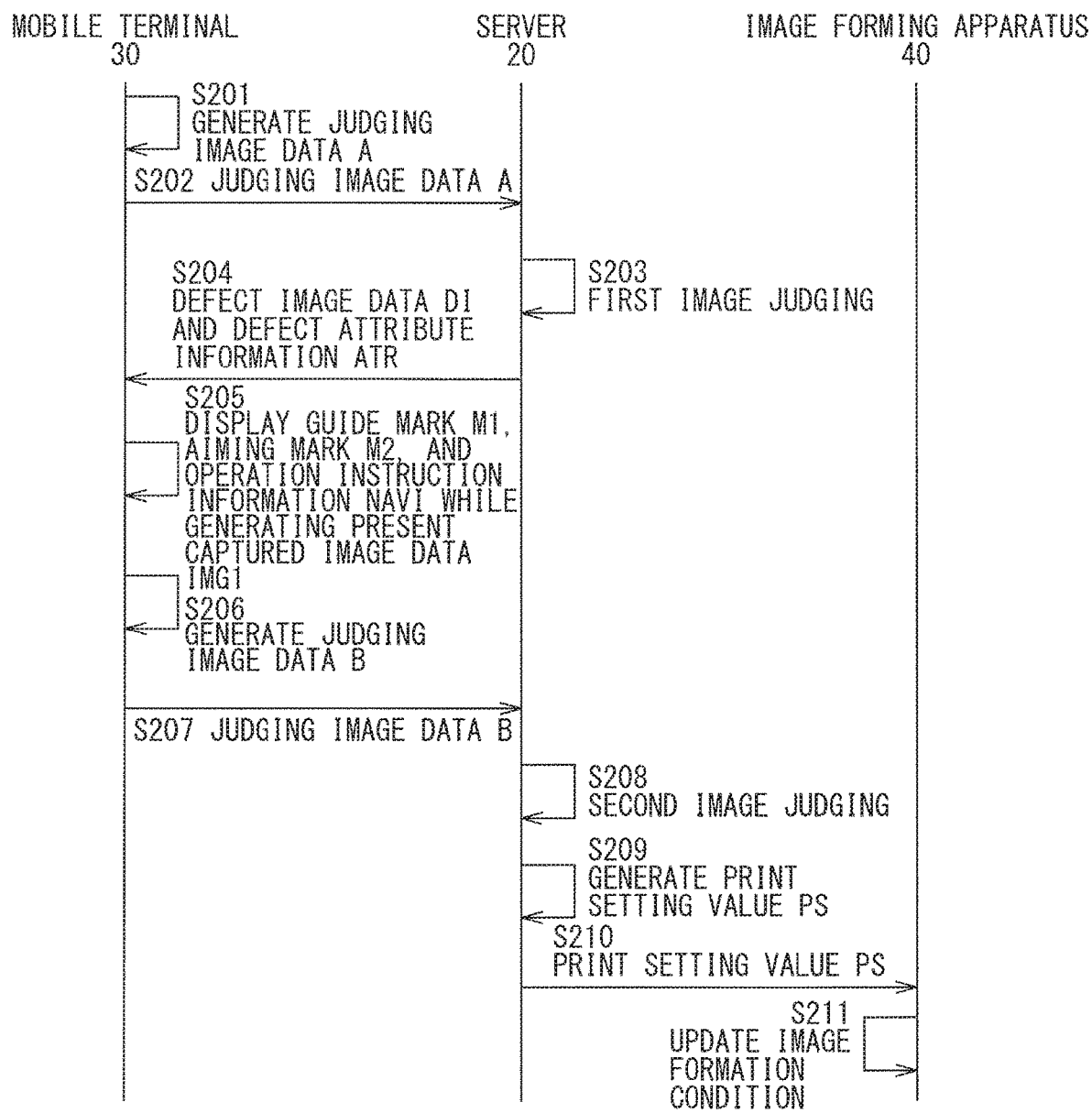
FIG. 4 is a sequence diagram illustrating an example of operation of the image judging system illustrated in FIG. 1.

FIG. 4 illustrates an example of operation of the image judging system 1 in the case where the image has a defect. In this example, the image judging system 1 may perform image judging on the basis of the judging chart DC with the defect illustrated in FIG. 2B. This operation is described below in detail.

First, the imaging unit 37 of the mobile terminal 30 may capture an image of the whole judging chart DC formed on the recording medium, and thereby generate the judging image data A (step S201). The imaging unit 37 may thereby generate the judging image data A representing the whole image of the judging chart DC.

The mobile terminal 30 may transmit the judging image data A to the server 20 (step S202).

The first image judging unit 23 of the server 20 may perform the first image judging on the basis of the judging image data A (step S203). The first image judging unit 23 may detect the position of the defect image DEF, the size of the defect image DEF, and the position of the landmark image LM1 corresponding to the defect image DEF.

Figure 5:
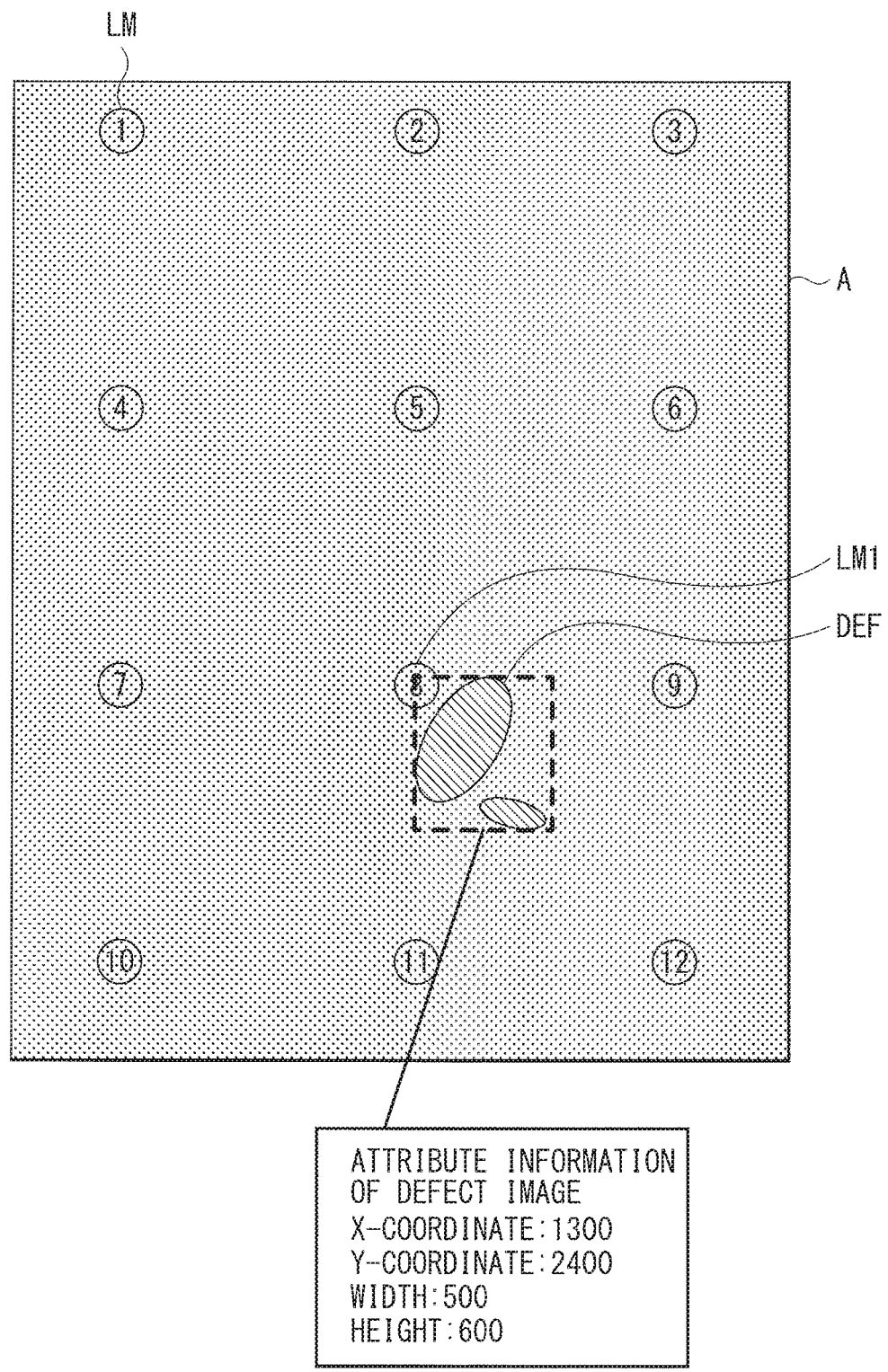
FIG. 5 is an explanatory diagram illustrating an example of a process illustrated in FIG. 3.

FIG. 5 illustrates an example of operation performed by the first image judging unit 23 of the server 20. In this example, the first image judging unit 23 may detect the defect image DEF on the basis of the judging image data A, and set a rectangular region 100 surrounding the defect image DEF. The rectangular region 100 is indicated by a dashed line in FIG. 5. Further, the first image judging unit 23 may generate the defect image data DI on the basis of image data included in the rectangular region 100. Further, the first image judging unit 23 may generate the defect attribute information ATR on the basis of the position of the landmark image LM1 corresponding to the defect image DEF, the position of the rectangular region 100, and the size of the rectangular region 100. In this example, the position of the rectangular region 100 may be provided as coordinates at the middle of the rectangular region 100. Coordinates at the middle of a certain region may be hereinafter referred to as representative coordinates of the region. The representative coordinates of the rectangular region 100 may be represented by $(X, Y)=(1300, 2400)$. The size of the rectangular region 100 may be represented by (width, height)=(500, 600). In this example, the landmark image LM1 corresponding to the defect image DEF may be the landmark image LM that is nearest to the defect image DEF and indicates the number "8" of the plurality of landmark images LM. The first image judging unit 23 may determine the position of the landmark image LM1 on the basis of the judging image data A. In one example, the defect attribute information ATR may include information related to the positions of all of the landmark images LM in the judging chart DC. In a case where the judging chart DC in the judging image data A is inclined, the first image judging unit 23 may perform appropriate correction in accordance with the judging, such as rotational correction.

As illustrated in FIG. 4, the server 20 may transmit the defect image data DI and the defect attribute information ATR to the mobile terminal 30 (step S204).

The mobile terminal 30 may capture an image of the judging chart DC to generate the present captured image data IMG1, and display the guide mark M1, the aiming mark M2, and the operation instruction information NAVI (step S205). In a specific but non-limiting example, the imaging unit 37 of the mobile terminal 30 may capture an image of the judging chart DC and thereby generate the present captured image data IMG1. Further, the guide information generating unit 33 may generate the guide mark M1, the aiming mark M2, and the operation instruction information NAVI on the basis of the present captured image data IMG1 and the defect attribute information ATR. Further, the display unit 36 may display the guide mark M1, the aiming mark M2, and the operation instruction information NAVI. In one example, the user may so vary the posture of the mobile terminal 30 that the imaging unit 37 is allowed to capture an enlarged image of the defect image DEF, on the basis of the instruction displayed on the display unit 36. In another example, the user may so operate the operation unit 35 of the mobile terminal 30 that the imaging unit 37 is allowed to capture an enlarged image of the defect image DEF, on the basis of an instruction displayed on the display unit 36. Detailed operation related to step S205 will be described later.

The imaging unit 37 of the mobile terminal 30 may capture an enlarged image of the defect image DEF in the judging chart DC, and thereby generate the judging image data B representing the enlarged image of the defect image DEF (step S206). The judging image data B may be the enlarged image of the defect image DEF and may be higher in resolution of the defect image DEF than the judging image data A.

The mobile terminal 30 may transmit the judging image data B to the server 20 (step S207).

The second image judging unit 24 of the server 20 may perform the second image judging on the basis of the judging image data B and with the use of the defect identification information 27 stored in the storage unit 26 (step S208). The second image judging unit 24 may extract a feature on the basis of the defect image DEF included in the judging chart DC and analyze the extracted feature with the use of the defect identification information 27 to thereby judge which type of defect the extracted feature corresponds to.

The print setting value generating unit 25 of the server 20 may generate the print setting value PS on the basis of a result of the second image judging performed by the second image judging unit 24 (step S209). Since the second image judging unit 24 has identified the type of defect corresponding to the defect image DEF, the second image judging unit 24 may be able to generate the print setting value PS that allows for improvement of the defect.

The server 20 may transmit the print setting value PS to the image forming apparatus 40 (step S210).

The image forming apparatus 40 may update the image formation condition on the basis of the received print setting value PS (step S211).

This may bring the sequence to an end.

A more detailed description is given below of operation, performed by the mobile terminal 30, of displaying the operation instruction information NAVI while generating the present captured image data IMG1 and generating the judging image data B which corresponds to the processes in step S205 and S206 illustrated in FIG. 4.

Figure 6:
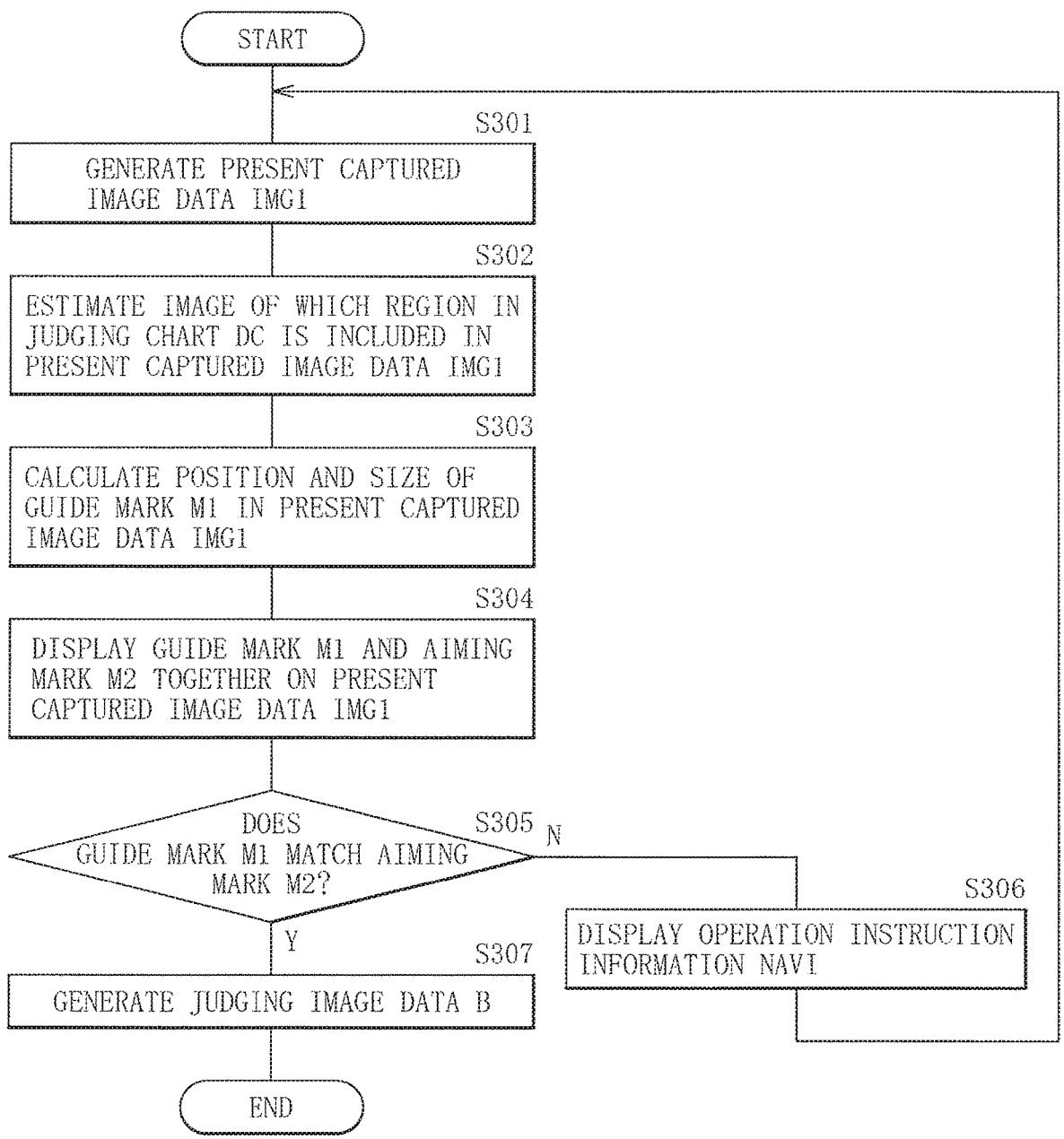
FIG. 6 is another flowchart illustrating an example of the operation of the image judging system illustrated in FIG. 1.

FIG. 6 illustrates an example of the operation performed by the mobile terminal 30 in steps S205 and S206 illustrated in FIG. 4. The imaging unit 37 of the mobile terminal 30 may repeatedly capture the image of the judging chart DC formed on the recording medium, and thereby repeatedly generate the present captured image data IMG1, for example. When an enlarged image of the defect image DEF becomes obtainable with a high resolution on the basis of the generated present captured image data IMG1, the imaging unit 37 may generate the judging image data B. This operation is described in detail below.

First, the imaging unit 37 of the mobile terminal 30 may so capture an image of the judging chart DC that one or more landmark images LM are included in the captured image, and thereby generate the present captured image data IMG1 (step S301).

Figure 7:
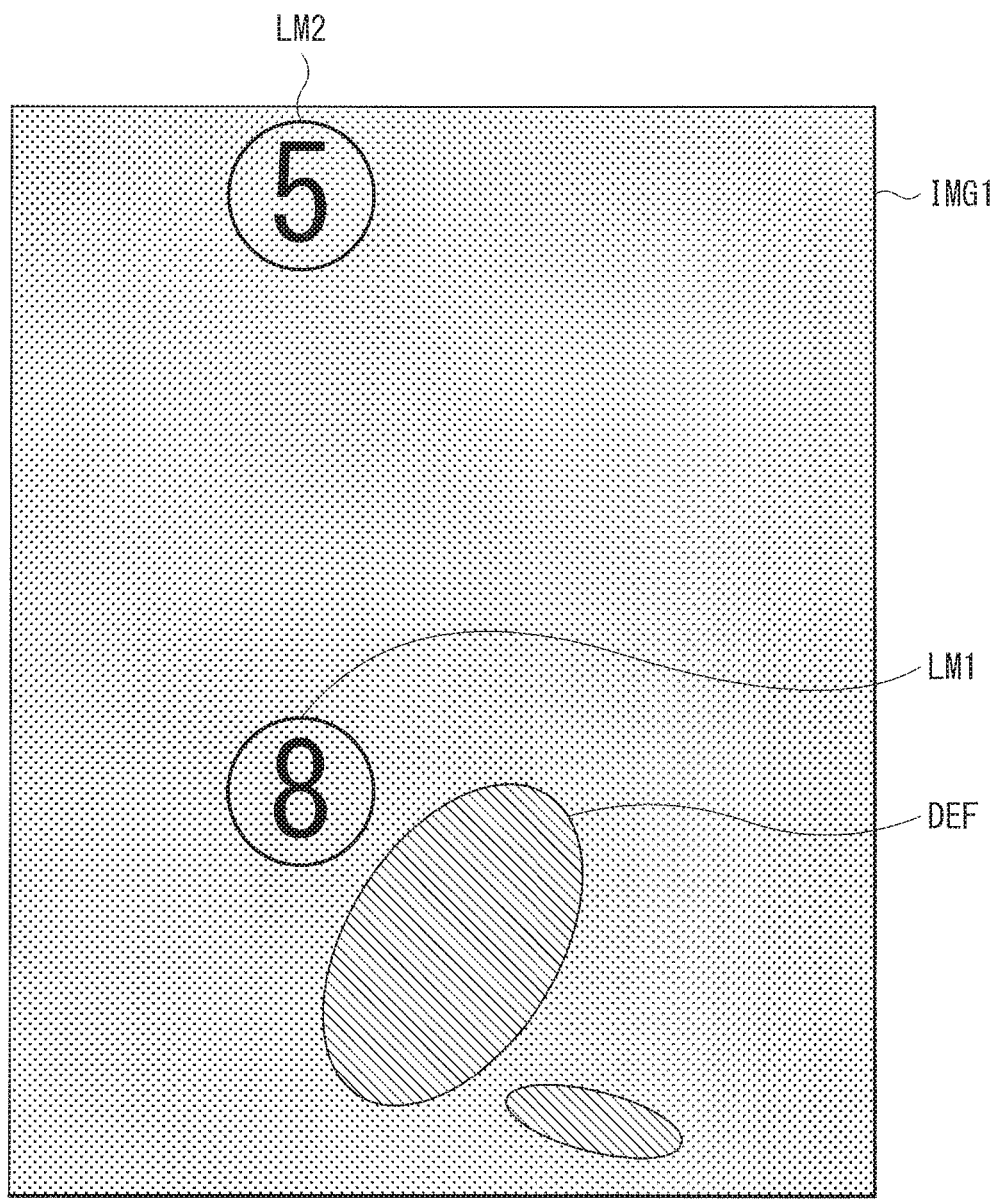
FIG. 7 is an explanatory diagram illustrating an example of a process illustrated in FIG. 6.

FIG. 7 illustrates an example of the present captured image data IMG1 captured by the imaging unit 37. In this example, the present captured image data IMG1 may include the defect image DEF, the landmark image LM1 indicating the number "8", and a landmark image LM2 indicating the number "5". The landmark image LM1 may be associated with the defect image DEF in the judging image data A.

The guide information generating unit 33 of the mobile terminal 30 may estimate an image of which region in the judging chart DC is included in the present captured image data IMG1, on the basis of the present captured image data IMG1 generated in step S301 (step S302). In a specific but non-limiting example, the guide information generating unit 33 may detect the landmark image LM1 in the present captured image data IMG1, and identify the position, the size, and the orientation of the landmark image LM1. Further, the guide information generating unit 33 may be able to estimate an image of which region in the judging image data A is included in the present captured image data IMG1, on the basis of the information related to the identified landmark image LM1 and the predetermined judging chart data used when the image forming apparatus 40 has formed the judging chart DC, for example. For example, in a case where the defect attribute information ATR includes the information related to the positions of all of the landmark images LM included in the judging chart DC, the guide information generating unit 33 may be able to estimate an image of which region in the judging image data A is included in the present captured image data IMG1, on the basis of the information related to the identified landmark image LM1 and the defect attribute information ATR.

Thereafter, the guide information generating unit 33 of the mobile terminal 30 may calculate the position and the size of the guide mark M1 in the present captured image data IMG1 (step S303).

First, the guide information generating unit 33 may calculate the position of the defect image DEF on the basis of a positional relationship between the defect image DEF in the judging image data A and the landmark image LM1 in the judging image data A and also of the position of the landmark image LM1 in the present captured image data IMG1. In a specific but non-limiting example, the guide information generating unit 33 may calculate an image distance DIS between the representative coordinates of the landmark image LM1 in the judging image data A and the representative coordinates of the defect image DEF in the judging image data A. In one example, the first image judging unit 23 may calculate the image distance DIS and the server 20 may supply a result of the calculation to the mobile terminal 30 with the use of the defect attribute information ATR. The guide information generating unit 33 may also calculate an image ratio SC between the size of the landmark image LM1 in the present captured image data IMG1 and the size of the landmark image LM1 in the judging image data A. Further, the guide information generating unit 33 may detect the orientation of the landmark image LM1 in the present captured image data IMG1. Further, the guide information generating unit 33 may perform coordinate conversion on the basis of the orientation of the landmark image LM1, the image distance DIS, and the image ratio SC, with reference to the representative coordinates of the landmark image LM1 in the present captured image data IMG1, and thereby calculate the position of the defect image DEF. The guide information generating unit 33 may thus perform the coordinate conversion on the basis of the orientation of the landmark image LM1 in the present captured image data IMG1 as described above. The guide information generating unit 33 may be thereby able to correctly estimate the position of the defect image DEF also in a case where an image of the judging chart DC is captured with inclination with respect to the imaging range.

Further, the guide information generating unit 33 may calculate the size of the defect image DEF on the basis of the information related to the size of the defect image DEF included in the defect attribute information ATR and the image ratio SC.

Further, the guide information generating unit 33 may calculate the position and the size of the guide mark M1 on the basis of the calculated position and the calculated size of the defect image DEF.

Thereafter, the display unit 36 may display the guide mark M1 and the aiming mark M2 together on the present captured image data IMG1 (step S304).

Figure 8:
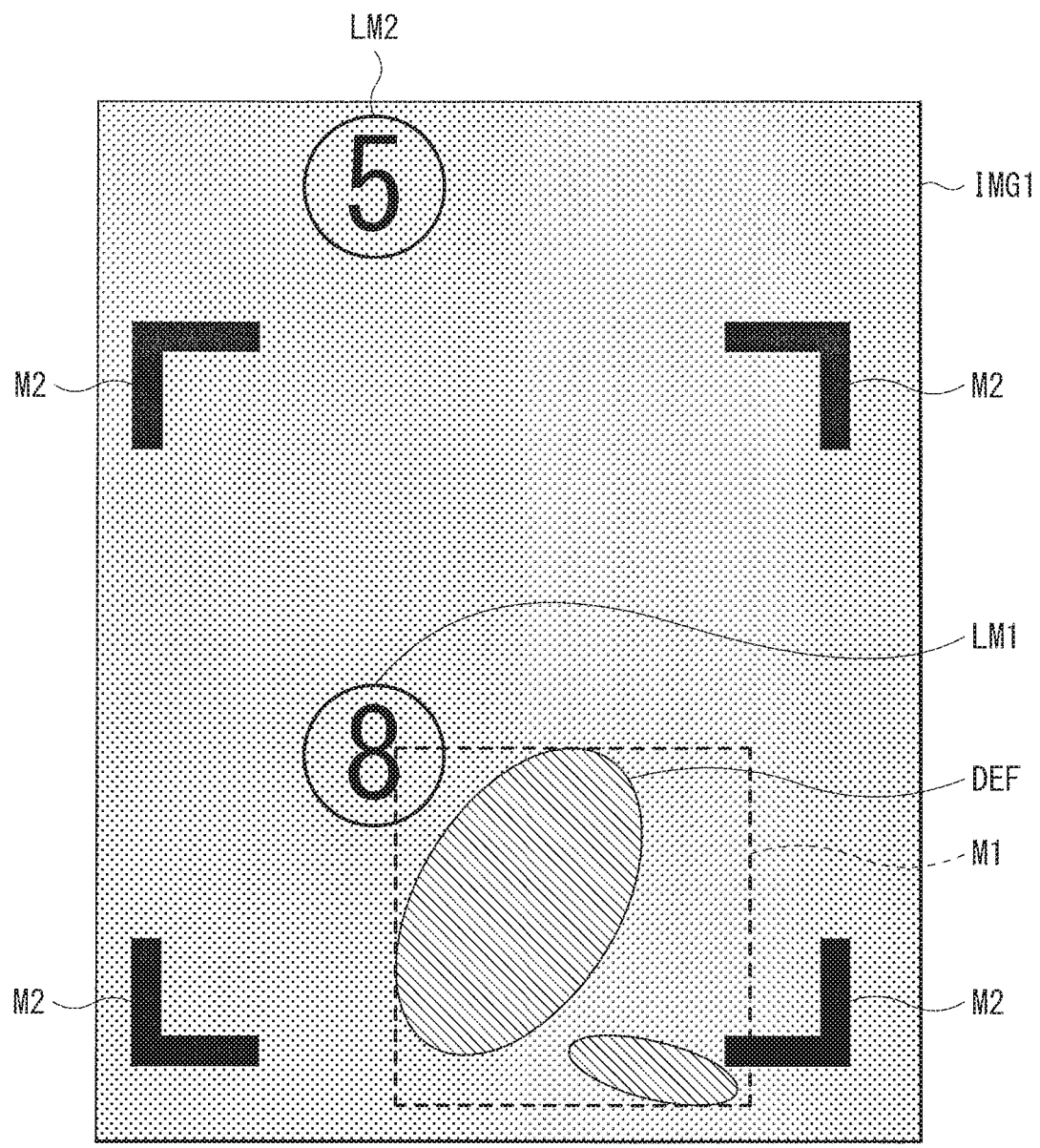
FIG. 8 is another explanatory diagram illustrating an example of the process illustrated in FIG. 6.

FIG. 8 illustrates an example of the guide mark M1 and the aiming mark M2 displayed together in the present captured image data IMG1. In this example, the guide mark M1 may have a frame shape surrounding the defect image DEF. The size of the guide mark M1 may be the same as the size of the defect image DEF in the present captured image data IMG1 or may be different from the size of the defect image DEF in the present captured image data IMG1. The aiming mark M2 may be displayed with a predetermined size at a position at which the guide mark M1 is to be disposed in order to capture an enlarged image of the defect image DEF. The aiming mark M2 may include four marks indicating respective four corners of a frame in this example. The four marks may be displayed at respective predetermined positions on the display screen of the display unit 36, for example. In a case where the landmark image LM1 is not included in the present captured image data IMG1, the position of the defect image DEF in the present captured image data IMG1 may not be calculated, and therefore, the guide mark M1 may not be displayed.

Thereafter, the guide information generating unit 33 may determine whether the guide mark M1 matches the aiming mark M2 (step S305). Complete match between the guide mark M1 and the aiming mark M2 is not necessary. It may be sufficient that the guide mark M1 be determined as matching the aiming mark M2 when a predetermined condition is satisfied. For example, the guide information generating unit 33 may determine that the guide mark M1 matches the aiming mark M2 on a condition that the size of the aiming mark M2 and the size of the guide mark M1 match each other within a predetermined range and the position of the guide mark M1 and the position of the aiming mark M2 match each other within a predetermined range. In a case where the guide mark M1 does not match the aiming mark M2 ("NO" in step S305), the guide information generating unit 33 may display the operation instruction information NAVI (step S306).

Figure 9:
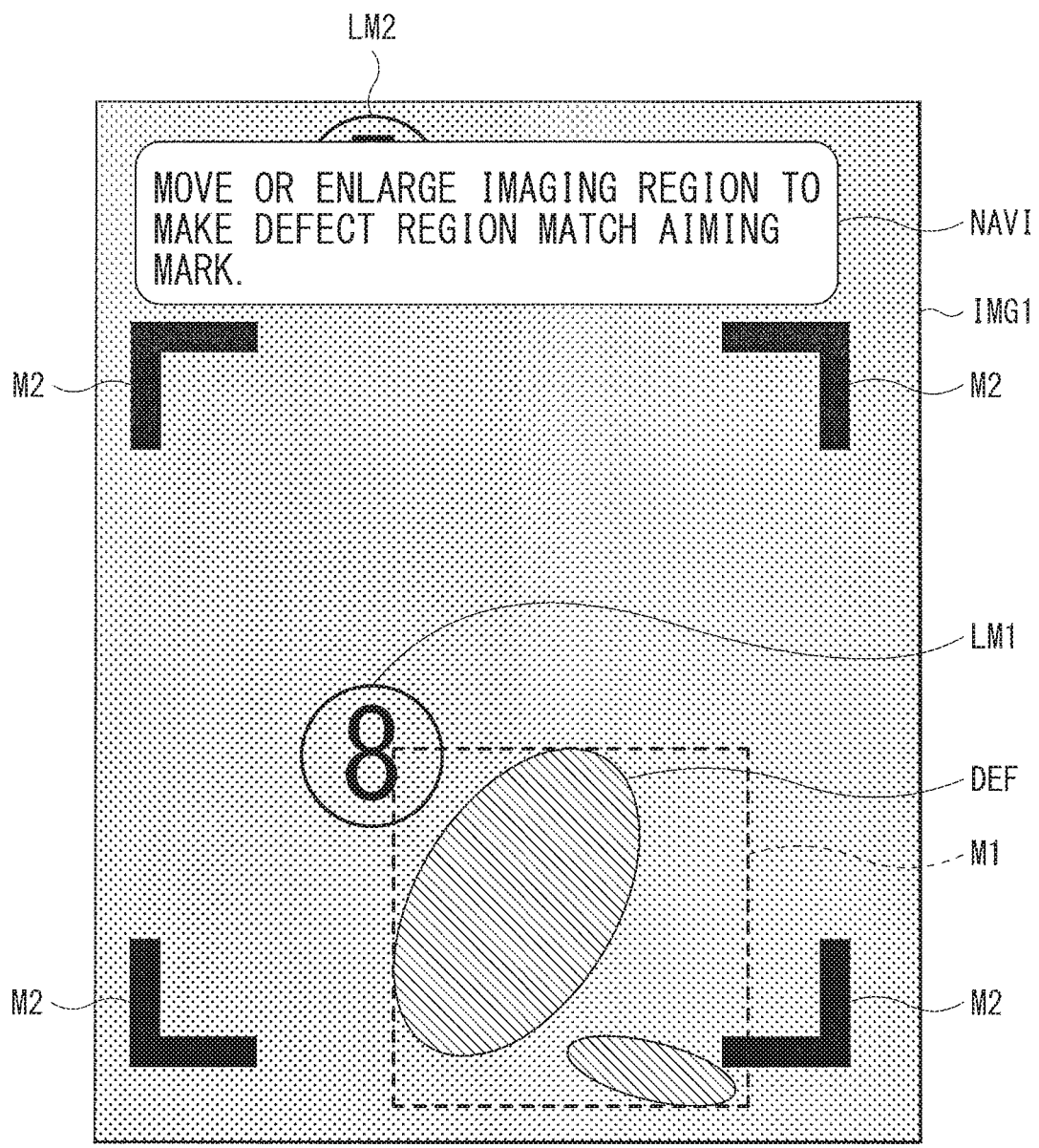
FIG. 9 is still another explanatory diagram illustrating an example of the process illustrated in FIG. 6.

FIG. 9 illustrates an example of the operation instruction information NAVI displayed on the display unit 36. As illustrated in FIG. 9, the display unit 36 may display the operation instruction information NAVI and the present captured image data IMG1 together. In the example illustrated in FIG. 9, the guide mark M1 does not match the aiming mark M2. The guide information generating unit 33 may generate, as an operation instruction required to make the guide mark M1 match the aiming mark M2, the operation instruction information NAVI that prompts the user to move or enlarge the imaging region to make the guide mark M1 match the aiming mark M2, and display the generated operation instruction information NAVI on the display unit 36.

For example, in a case where only the landmark image LM positioned in an upper portion compared with the landmark image LM1 is included in the present captured image data IMG1, the display unit 36 may display the operation instruction information NAVI indicating to move the imaging region to a lower portion of the judging chart DC. For example, in a case where the ratio of the size of the guide mark M1 to the size of the aiming mark M2 does not fall within a predetermined range, the display unit 36 may display the operation instruction information NAVI indicating to bring the mobile terminal 30 closer to the recording medium formed with the judging chart DC or may display the operation instruction information NAVI indicating to enlarge the image to be captured by means of optical zooming or any other method. In one example, the operation instruction information NAVI may prompt the user to perform gesture operation such as flicking, pinch-in, or pinch-out. For example, in a case where the judging chart DC is inclined in the present captured image data IMG1, the display unit 36 may display the operation instruction information NAVI indicating to vary the orientation of the imaging region. After displaying the operation instruction information NAVI as described above, the flow may return to step S301. The operation in steps S301 to S306 may be repeatedly performed until the guide mark M1 matches the aiming mark M2.

In a case where the guide mark M1 matches the aiming mark M2 ("YES" in step S305), the imaging unit 37 may capture an image of the judging chart DC and thereby generate the judging image data B (step S307).

Figure 10:
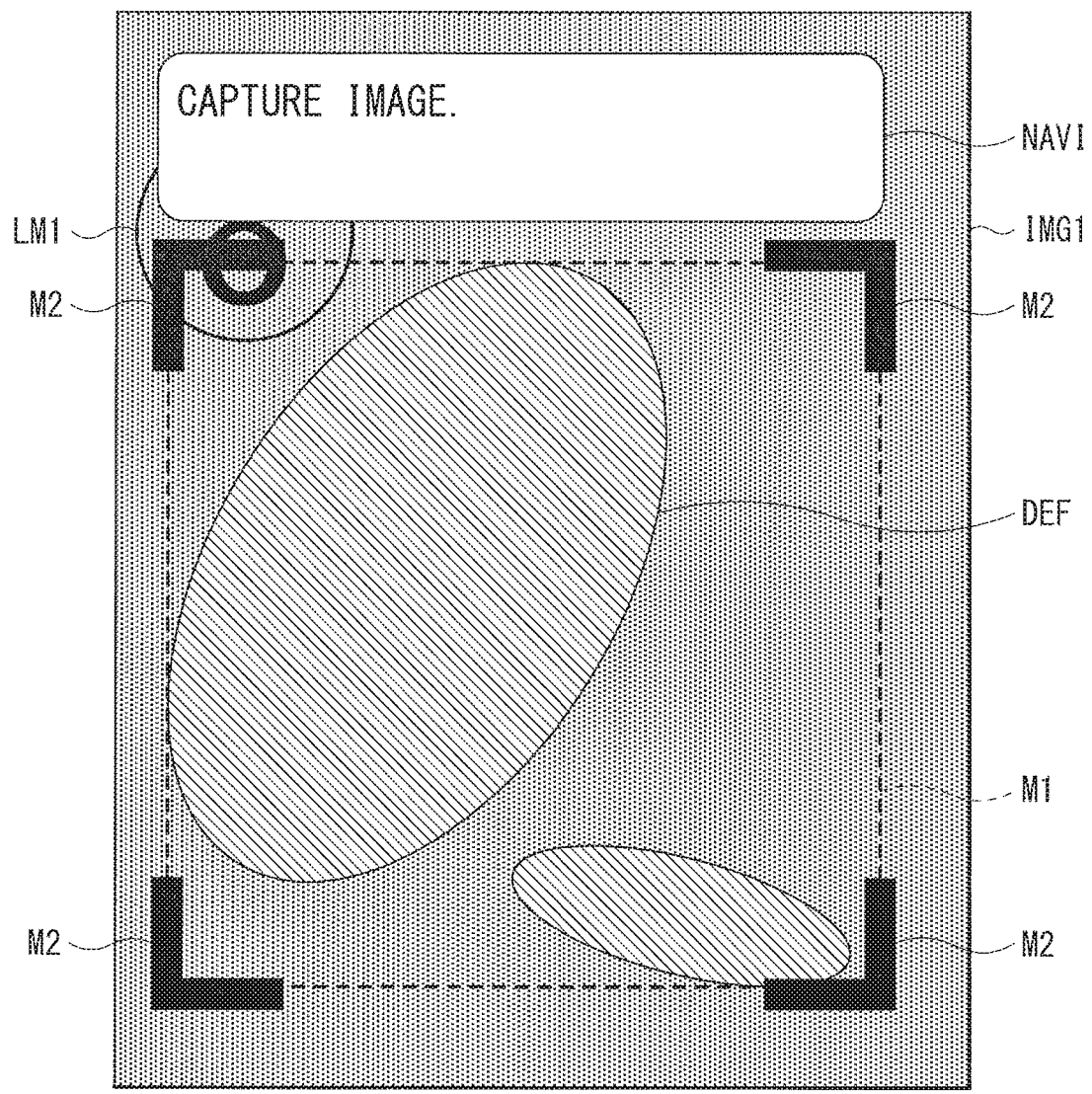
FIG. 10 is still another explanatory diagram illustrating an example of the process illustrated in FIG. 6.

FIG. 10 illustrates an example of the display screen of the display unit 36 in a case where the guide mark M1 matches the aiming mark M2. The display unit 36 may display the guide mark M1 and the aiming mark M2 together in the present captured image data IMG1. The display unit 36 may display the operation instruction information NAVI prompting the user to capture an image since the guide mark M1 matches the aiming mark M2. The operation instruction information NAVI is not limited to the example illustrated in FIG. 10, and may be any information as long as the operation instruction information NAVI is able to let the user know that the user can perform imaging. In a specific but non-limiting example, the color of the guide mark M1 may be changed in a case where the guide mark M1 matches the aiming mark M2. The user of the mobile terminal 30 may perform imaging operation with the use of the operation unit 35 on the basis of the operation instruction information NAVI. The imaging unit 37 may capture an image of the judging chart DC and thereby generate the judging image data B. This is, however, non-limiting. In one example, the imaging unit 37 may capture an image of the judging chart DC without the user's imaging operation in a case where the guide mark M1 matches the aiming mark M2. The judging image data B thus generated may have a higher resolution of the defect image DEF compared to that in the judging image data A.

This may bring the flow to an end.

As described above, in the image judging system 1, the first image judging unit 23 of the server 20 may perform the first image judging on the basis of the judging image data A representing the whole image of the judging chart DC formed by the image forming apparatus 40. In a case where the image has a defect, the mobile terminal 30 may prompt the user to capture an enlarged image of the defect image DEF and thereby generate the judging image data B representing the enlarged image of the defect image DEF. The second image judging unit 24 of the server 20 may perform the second image judging on the basis of the generated judging image data B, and the print setting value generating unit 25 may generate the print setting value PS on the basis of a result of the second image judging. The image judging system 1 may thereby able to update the image formation condition of the image forming apparatus 40 on the basis of the print setting value PS. As a result, it is possible to improve image quality.

In a case where image judging is performed only on the basis of the judging image data A representing the whole image of the judging chart DC, sufficient information of the defect image DEF which is a portion of the whole image may not be obtainable. This can lead to a failure in appropriate judging of a type of the defect. In contrast, in the image judging system 1, the second image judging unit 24 may acquire detailed information related to the defect image DEF on the basis of the judging image data B and thereby judge the image. This allows for reading of a detailed texture of the defect image DEF, and therefore allows highly-accurate judging of the type of the defect. As a result, it is possible to improve image judging accuracy in the image judging system 1. It is therefore possible to improve image quality.

Moreover, in the image judging system 1, the guide information generating unit 33 calculates the position of the guide mark M1 to be disposed in the present captured image data IMG1, on the basis of the positional relationship between the defect image DEF in the judging image data A and the landmark image LM1 in the judging image data A and of the position of the landmark image LM1 in the present captured image data IMG1. Further, the display unit 36 may display the guide mark M1 and the aiming mark M2, and thereby prompt the user to make the guide mark M1 match the aiming mark M2. The imaging unit 37 may be thereby allowed to generate the judging image data B representing the enlarged image of the defect image DEF. As a result, it is possible for the image judging system 1 to perform the image judging of the defect image DEF. It is therefore possible to improve image quality.

Moreover, in the image judging system 1, the guide information generating unit 33 may calculate the size of the guide mark M1 in the present captured image data IMG1 on the basis of the size of the landmark image LM1 in the judging image data A, the size of the landmark image LM1 in the present captured image data IMG1, and the size of the defect image DEF in the judging image data A. Further, the display unit 36 may display the guide mark M1 and the aiming mark M2, and prompt the user to make the guide mark M1 match the aiming mark M2. The imaging unit 37 may be thereby allowed to generate the judging image data B with a higher resolution representing the enlarged image of the defect image DEF. As a result, it is possible for the image judging system 1 to perform image judging with the use of the high-resolution image data of the defect image DEF. It is therefore possible to improve image quality.

Moreover, in the image judging system 1, the guide information generating unit 33 may generate the operation instruction information NAVI that is message information prompting the user to capture an enlarged image of the defect image DEF. In a specific but non-limiting example, the guide information generating unit 33 may generate message information related to specific operation directed to making the guide mark M1 match the aiming mark M2. This may allow for notifying the user of the mobile terminal 30 of operation necessary to make the guide mark M1 match the aiming mark M2. As a result, it is possible to improve user friendliness of the image judging system 1.

Moreover, in the image judging system 1, the guide information generating unit 33 may generate the guide mark M1 on the basis of the defect image DEF judged by the first image judging unit 23. This allows, upon generation of the judging image data B, the user of the mobile terminal 30 to capture an image of the defect image DEF on the basis of the guide mark M1, even for a portion having a defect which is subjectively undeterminable by the user as a defect. It is therefore possible to improve image quality.

Example Effects

As described above, in the example embodiment, a user may be prompted to capture an enlarged image of a defect image. The judging image data B representing the enlarged image of the image data of the defect image may be generated thereby. The second image judging may be performed on the basis of the judging image data B. The print setting value may be generated on the basis of a result of the second image judging. As a result, it is possible to update the image formation condition of the image forming apparatus on the basis of the generated print setting value. It is therefore possible to improve image quality.

In the example embodiment, the position of the guide mark to be disposed in the present captured image data on the basis of the positional relationship between the defect image in the judging image data A and the landmark image LM1 in the judging image data A and of the position of the landmark image LM1 in the present captured image data. The guide mark and the aiming mark may be displayed, and the user may be prompted to make the guide mark match the aiming mark. As a result, it is possible to generate the judging image data B representing the enlarged image of the defect image. It is therefore possible to improve image quality.

In the example embodiment, the size of the guide mark in the present captured image data may be calculated on the basis of the size of the landmark image LM1 in the judging image data A, the size of the landmark image LM1 in the present captured image data, and the size of the defect image in the judging image data A. The guide mark and the aiming mark may be displayed, and the user may be prompted to make the guide mark match the aiming mark. As a result, it is possible to generate the judging image data B with a higher resolution representing the enlarged image of the defect image. It is therefore possible to improve image quality.

In the example embodiment, the operation instruction information may be generated that is the message information prompting the user to capture an enlarged image of the defect image. As a result, it is possible to notify the user of the mobile terminal of operation necessary to make the guide mark match the aiming mark. It is therefore possible to improve user friendliness.

In the example embodiment, the guide mark may be generated on the basis of the defect image judged by the first image judging unit. As a result, it is possible to capture an image of the defect image on the basis of the guide mark even for a portion having a defect which is subjectively undeterminable by the user as a defect. It is therefore possible to improve image quality.

Modification Example 1

In the example embodiment described above, the server 20 may include the first image judging unit 23, the second image judging unit 24, the print setting value generating unit 25, and the defect identification information 27; however, this is non-limiting. In one example, the mobile terminal may include a portion or all of the first image judging unit, the second image judging unit, the print setting value generating unit, and the defect identification information. A detailed description is given below of an example case where the mobile terminal includes the first image judging unit, the second image judging unit, the print setting value generating unit, and the defect identification information.

Figure 11:
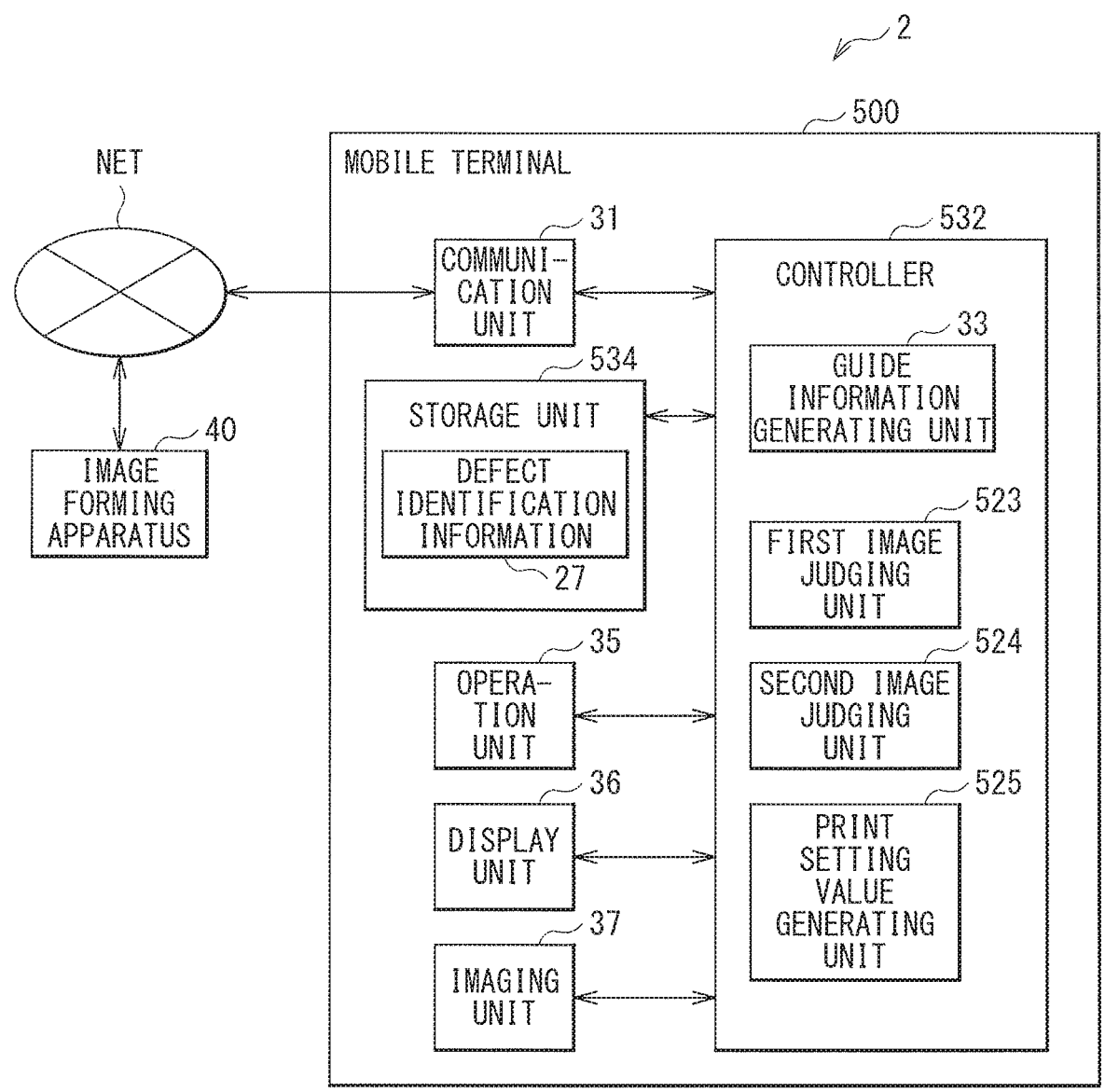
FIG. 11 is a block diagram illustrating an example of a configuration of an image judging system according to a modification example.

FIG. 11 illustrates an example of a configuration of an image judging system 2 according to Modification Example 1. The image judging system 2 may include a mobile terminal 500 and the image forming apparatus 40. The mobile terminal 500 may include the communication unit 31, a controller 532, a storage unit 534, the operation unit 35, the display unit 36, and the imaging unit 37. The controller 532 may include the guide information generating unit 33, a first image judging unit 523, a second image judging unit 524, and a print setting value generating unit 525. The first image judging unit 523 may correspond to the first image judging unit 23 illustrated in FIG. 1 according to the above-described example embodiment. The second image judging unit 524 may correspond to the second image judging unit 24 illustrated in FIG. 1 according to the above-described example embodiment. The print setting value generating unit 525 may correspond to the print setting value generating unit 25 illustrated in FIG. 1 according to the above-described example embodiment. The storage unit 534 may hold the defect identification information 27.

The first image judging unit 523 may correspond to the "position calculating unit" in one specific but non-limiting embodiment of the technology. The second image judging unit 524 and the print setting value generating unit 525 may correspond to the "image judging unit" in one specific but non-limiting embodiment of the technology.

Figure 12:
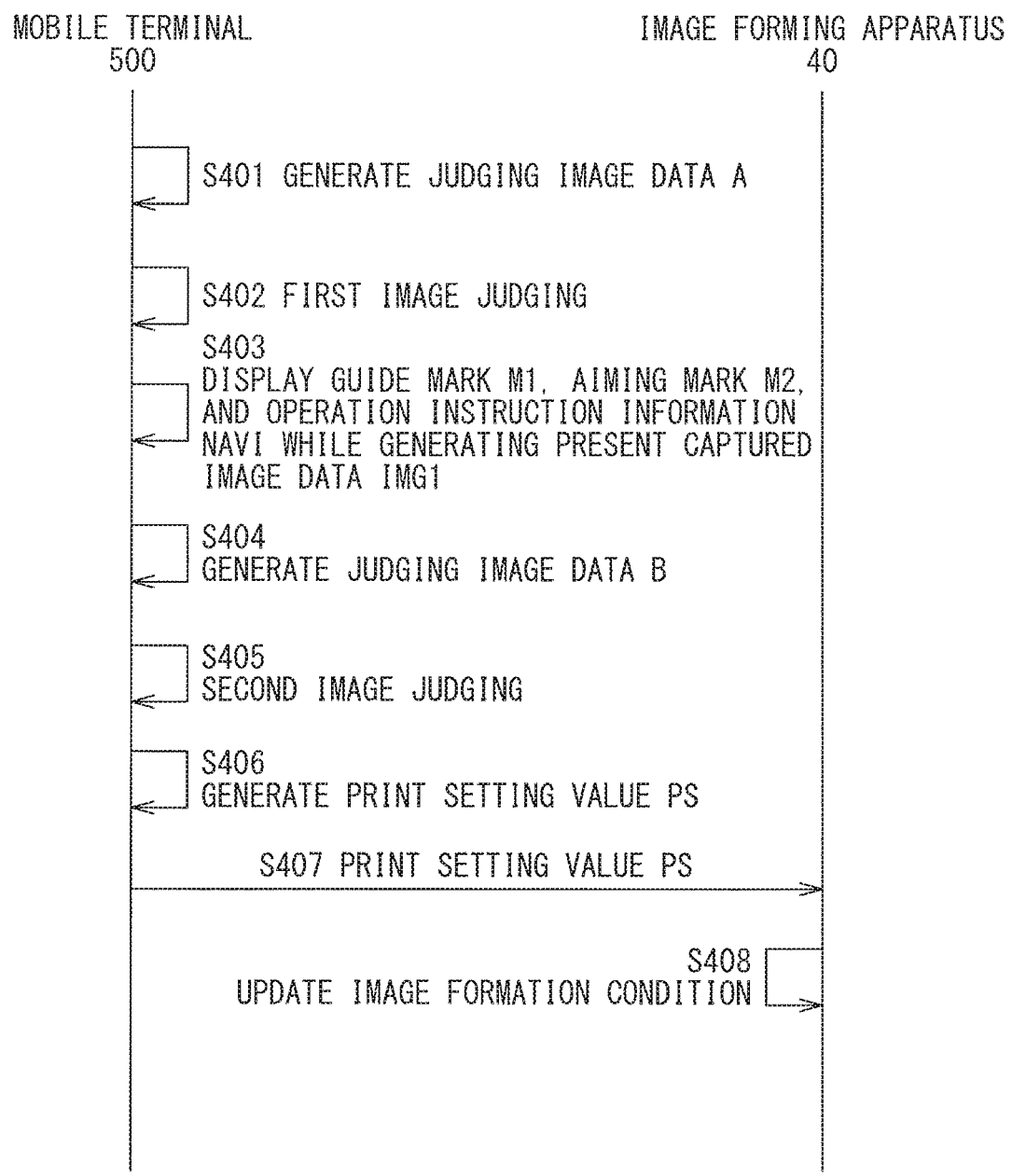
FIG. 12 is a sequence diagram illustrating an example of the operation of the image judging system illustrated in FIG. 10.

FIG. 12 illustrates an example of operation of the image judging system 2 in a case where an image has a defect.

First, the imaging unit 37 of the mobile terminal 500 may capture an image of the whole judging chart DC, and thereby generate the judging image data A (step S401).

Thereafter, the first image judging unit 523 may perform the first image judging on the basis of the judging image data A, in a manner similar to that of the first image judging unit 23 according to the above-described example embodiment (step S402). The first image judging unit 523 may thereby generate the defect image data DI and the defect attribute information ATR.

In a case where the image does not have any defect, the guide information generating unit 33 may generate information indicating absence of the defect, and the display unit 36 may display information indicating the absence of the defect.

Thereafter, in a manner similar to that of the mobile terminal 30 according to the above-described example embodiment, the mobile terminal 500 may capture an image of the judging chart DC, thereby generate the present captured image data IMG1, and display the guide mark M1, the aiming mark M2, and the operation instruction information NAVI (step S403).

Thereafter, the imaging unit 37 may capture an enlarged image of the defect image DEF in the judging chart DC, and thereby generate the judging image data B representing the enlarged image of the defect image DEF (step S404).

Thereafter, the second image judging unit 524 may perform the second image judging on the basis of the judging image data B and with the use of the defect identification information 27, in a manner similar to that of the second image judging unit 24 according to the above-described example embodiment (step S405).

Thereafter, the print setting value generating unit 525 may generate the print setting value PS on the basis of a result of the second image judging performed by the second image judging unit 524, in a manner similar to that of the print setting value generating unit 25 according to the above-described example embodiment (step S406).

Thereafter, the mobile terminal 500 may transmit the print setting value PS to the image forming apparatus 40, in a manner similar to that of the mobile terminal 30 according to the above-described example embodiment (step S407).

Thereafter, the image forming apparatus 40 may update the image formation condition on the basis of the received print setting value PS (step S408).

This may bring the sequence to an end.

Modification Example 2

In the example embodiment described above, the guide information generating unit 33 may be provided in the controller 32 of the mobile terminal 30, and the mobile terminal 30 may generate the guide mark M1, the aiming mark M2, and the operation instruction information NAVI; however, this is non-limiting. In another example, the guide information generating unit may be provided in a controller of a server, and the server may generate the guide mark M1, the aiming mark M2, and the operation instruction information NAVI.

Modification Example 3

In the example embodiment described above, the guide information generating unit 33 may calculate the image ratio SC on the basis of the size of the landmark image LM1 in the present captured image data IMG1 and the size of the landmark image LM1 in the judging image data A; however, this is non-limiting. In another example, in a case where the present captured image data IMG1 and the judging image data A each include two landmark images LM, the guide information generating unit 33 may calculate the image ratio SC on the basis of a ratio between a distance from one of the landmark images LM to the other of the landmark images LM in the present captured image data IMG1 and a distance from one of the landmark images LM to the other of the landmark images LM in the judging image data A.

Modification Example 4

In the example embodiment described above, the guide information generating unit 33 may detect the orientation of the judging chart DC in the captured image on the basis of the orientation of the landmark image LM1 in the present captured image data IMG1; however, this is non-limiting. In another example, the guide information generating unit 33 may detect the orientation of the judging chart DC in the captured image on the basis of a direction in which two landmark images LM are arranged in the present captured image data IMG1.

Modification Example 5

In the example embodiment described above, the entire surface of the judging chart DC may be filled in black and the landmark images LM with the respective numbers may be disposed with predetermined intervals; however, this is non-limiting. The judging chart DC may be any kind of chart as long as the judging chart DC allows for identification of a defect portion. Modification Example 5 is described in detail below.

Figure 13:
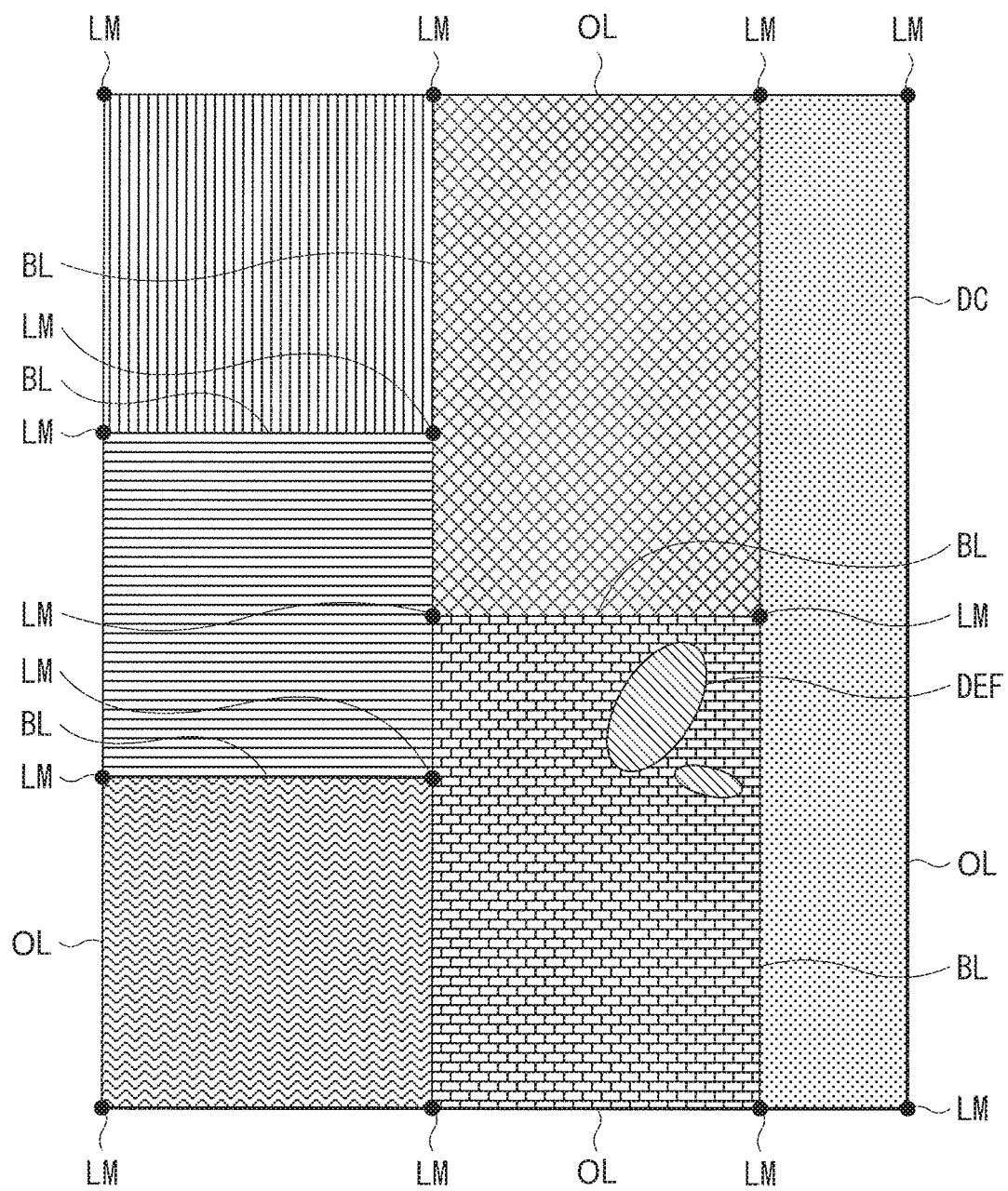
FIG. 13 is an explanatory diagram illustrating an example of a judging chart according to a modification example.

FIG. 13 illustrates an example of the judging chart DC according to Modification Example 5. The judging chart DC according to Modification Example 5 may include two or more regions that are filled in respective colors that are different from each other. Two or more hatched portions in FIG. 13 indicate that the corresponding portions are filled in respective colors that are different from each other. The two or more landmark images LM in this judging chart DC may be dot images that are provided on four outer peripheral lines OL and two or more border lines BL. The four outer peripheral lines OL may correspond to respective four sides of an outer periphery of the judging chart DC. The border lines BL may define the two or more regions. The dot images may be provided at points where the border lines BL of the regions cross each other, points where the border lines BL cross the outer peripheral lines OL, and points where the outer peripheral lines OL cross each other in this example. The landmark images LM in this example may be dot images without size information.

In this case, in one example, the guide information generating unit 33 may calculate the image ratio SC on the basis of a ratio between a distance from one of two landmark images LM to the other of the two landmark images LM in the present captured image data IMG1 and a distance from the one of the two landmark images LM to the other of the two landmark images LM in the judging image data A, as in Modification Example 3. In another example, the guide information generating unit 33 may detect the orientation of the judging chart DC in the captured image on the basis of a direction in which two landmark images LM are arranged in the present captured image data IMG1, as in Modification Example 4.

Modification Example 6

In the example embodiment described above, the server 20 may transmit the print setting value PS to the image forming apparatus 40 via the network NET; however, this is non-limiting. In another example, the server 20 may transmit the print setting value PS to the mobile terminal 30. In this case, the mobile terminal 30 may cause the display unit 36 to display the print setting value PS, and the user of the mobile terminal 30 may operate the operation unit of the image forming apparatus 40 on the basis of the print setting value PS to set the setting value of the image forming apparatus 40. Further, the mobile terminal 30 may supply the print setting value PS to the image forming apparatus 40 without the network NET but with any other method such as near field communication (NFC) or infrared communication.

Modification Example 7

In the example embodiment described above, the imaging unit 37 of the mobile terminal 30 may generate the judging image data A; however, this is non-limiting. In another example, a device that is other than the mobile terminal 30 and includes an imaging unit may generate the judging image data A. The device that is other than the mobile terminal 30 and includes the imaging unit may be, for example but not limited to, a mobile terminal or a scanner apparatus.

Modification Example 8

In the example embodiment described above, each of the guide mark M1 and the aiming mark M2 may be a frame indicating a certain region; however, this is non-limiting. In another example, each of the guide mark M1 and the aiming mark M2 may have any shape that is able to express a position and a size. Non-limiting examples of each of the guide mark M1 and the aiming mark M2 may include a mark having a region filled in any color, a cross mark, or a combination thereof.

Modification Example 9

In the example embodiment described above, the display unit 36 may display the aiming mark M2 indicating a region in which the dashed-line frame to surround the defect image DEF is to be disposed; however, this is non-limiting. In another example, the aiming mark M2 may not be displayed. In this case, a display region of the display unit 36 may serve as the aiming mark M2. In other words, the whole image region represented by the present captured image data IMG1 may serve as the aiming mark M2.

Modification Example 10

In the example embodiment described above, the image judging may be performed with attention being paid to the defect image DEF; however, this is non-limiting. In another example, attention may be paid to an image other than the defect image DEF. In a specific but non-limiting example, the image judging may be performed with attention being paid to a high-quality image. In this case, the high-quality image may correspond to the "image of interest" in one specific but non-limiting embodiment of the technology.

Other Modification Examples

Further, two or more of the modification examples described above may be adopted in combination.

Although one embodiment of the technology has been described above with reference to the example embodiments and the modification examples thereof, one embodiment of the technology is not limited to the example embodiments and the modification examples described above and may be modified in a variety of ways.

For example, one embodiment of the technology may be applied to a single-function printer in the example embodiments and the modification examples described above; however, this is non-limiting. In another example, one embodiment of the technology may be applied to a so-called multi-function peripheral (MFP) having functions including a copy function, a facsimile function, a scanning function, and a printing function.

For example, in the example embodiments and the modification examples described above, the server 20, the mobile terminal 30, and the image forming apparatus 40 may communicate with each other via the network NET which may be the Internet; however, this is non-limiting. In another example, the server 20, the mobile terminal 30, and the image forming apparatus 40 may communicate with each other not via the network NET such as the Internet but by any other method such as the LAN, the infrared communication, or a universal serial but (USB).

Furthermore, the technology encompasses any possible combination of some or all of the various embodiments and the modifications described herein and incorporated herein. It is possible to achieve at least the following configurations from the above-described example embodiments of the technology.

(1)

An image judging system including:
a server; and
a mobile terminal that performs communication between the server and the mobile terminal,
the server including
a position calculating unit that calculates a position of an image of interest in a whole image data and a position of a first landmark image in the whole image data, the whole image data being obtained on the basis of a judging target image, the judging target image being provided on a recording medium and including a plurality of landmark images and the image of interest, the first landmark image being one, of the landmark images, corresponding to the image of interest, the mobile terminal including an imaging unit that captures an image of the judging target image and thereby generates image data, the server or the mobile terminal including a guide information generating unit that detects the first landmark image in the image data, and calculates a position of a guide mark on the basis of a positional relationship and a position of the first landmark image in the image data, the positional relationship being a positional relationship between the image of interest in the whole image data and the first landmark image in the whole image data, the guide mark being to be disposed in the image data and relative to the image of interest, the mobile terminal including a display unit that displays the image data and the guide mark together, the imaging unit generating related image data after the display unit displays the guide mark, the related image data being related to the judging target image.

(2)

The image judging system according to (1), in which the related image data includes enlarged image data of the judging target image.

(3)

The image judging system according to (1) or (2), in which the position calculating unit further calculates a size of the image of interest on the basis of the whole image data, and the guide information generating unit further detects a size of the first landmark image in the image data, and calculates a size of the guide mark on the basis of a size of the first landmark image in the whole image data, the detected size of the first landmark image in the image data, and the size of the image of interest calculated by the position calculating unit.

(4)

The image judging system according to (1) or (2), in which the position calculating unit further calculates a size of the image of interest in the whole image data and a position of a second landmark image of the landmark images in the whole image data, the guide information generating unit further detects the second landmark image in the image data, and calculates a size of the guide mark on the basis of a first distance, a second distance, and the size of the image of interest calculated by the position calculating unit, the first distance being a distance from the first landmark image to the second landmark image in the whole image data, the second distance being a distance from the first landmark image to the second landmark image in the image data.

(5)

The image judging system according to (3) or (4), in which the size of the guide mark in the image data corresponds to a size of the image of interest in the image data.

(6)

The image judging system according to any one of (3) to (5), in which the display unit displays a reference mark in addition to the image data and the guide mark together, the reference mark indicating a position to dispose the guide mark, and the imaging unit generates the related image data after the position and the size of the guide mark are adjusted on the basis of a position and a size of the reference mark.

(7)

The image judging system according to any one of (3) to (5), in which the imaging unit generates the related image data after the size of the guide mark is adjusted on the basis of a size of a display region of the display unit.

(8)

The image judging system according to any one of (3) to (7), in which the guide information generating unit generates instruction information, the instruction information notifying a user of a method of adjusting the position, the size, or both of the guide mark in the image data.

(9)

The image judging system according to (8), in which the instruction information including an instruction to adjust a distance from the mobile terminal to the recording medium on which the judging target image is provided.

(10)

The image judging system according to any one of (3) to (9), in which the mobile terminal includes an operation unit that receives operation of adjusting the position of the guide mark and the size of the guide mark, and the imaging unit sets an imaging range on the basis of an instruction given from the operation unit.

(11)

The image judging system according to any one of (1) to (10), in which the guide mark has a frame shape that surrounds a portion or all of the image of interest.

(12)

The image judging system according to any one of (1) to (11), in which the first landmark image includes one or more of a character, number, and a symbol.

(13)

The image judging system according to any one of (1) to (12), in which the judging target image is formed on the recording medium by an image forming apparatus, and the server includes an image judging unit that performs image judging on the basis of the related image data and thereby generates a setting value of an image formation parameter of the image forming apparatus.

(14)

An image judging apparatus including:

a position calculating unit that calculates a position of an image of interest in a whole image data and a position of a first landmark image in the whole image data, the whole image data being obtained on the basis of a judging target image, the judging target image being provided on a recording medium and including a plurality of landmark images and the image of interest, the first landmark image being one, of the landmark images, corresponding to the image of interest;

an imaging unit that captures an image of the judging target image and thereby generates image data;

a guide information generating unit that detects the first landmark image in the image data, and calculates a position of a guide mark on the basis of a positional relationship and a position of the first landmark image in the image data, the positional relationship being a positional relationship between the image of interest in the whole image data and the first landmark image in the whole image data, the guide mark being to be disposed in the image data and relative to the image of interest; and a display unit that displays the image data and the guide mark together, the imaging unit generating related image data after the display unit displays the guide mark, the related image data being related to the judging target image.

(15)

An image judging method including:
calculating a position of an image of interest in a whole image data and a position of a first landmark image in the whole image data, the whole image data being obtained on the basis of a judging target image, the judging target image being provided on a recording medium and including a plurality of landmark images and the image of interest, the first landmark image being one, of the landmark images, corresponding to the image of interest;
capturing an image of the judging target image and thereby generating image data;
detecting the first landmark image in the image data;
calculating a position of a guide mark on the basis of a positional relationship and a position of the first landmark image in the image data, the positional relationship being a positional relationship between the image of interest in the whole image data and the first landmark image in the whole image data, the guide mark being to be disposed in the image data and relative to the image of interest;
displaying the image data and the guide mark together; and
generating related image data after the displaying of the guide mark, the related image data being related to the judging target image.

According to the image judging system, the image judging apparatus, and the image judging method of one embodiment of the technology, the first landmark image in the image data generated by capturing the image of the judging target image is detected. The position of the guide mark is calculated on the basis of the positional relationship and the position of the first landmark image in the image data. The positional relationship is the positional relationship between the image of interest in the whole image data and the first landmark image in the whole image data. The guide mark is to be disposed in the image data and relative to the image of interest. The image data and the guide mark are displayed together. The related image data is generated after the guide mark is displayed. The related image data is related to the judging target image. As a result, it is possible to improve image quality.

Although the technology has been described in terms of exemplary embodiments, it is not limited thereto. It should be appreciated that variations may be made in the described embodiments by persons skilled in the art without departing from the scope of the invention as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. The term "substantially" and its variations are defined as being largely but not necessarily wholly what is specified as understood by one of ordinary skill in the art. The term "about" or "approximately" as used herein can allow for a degree of variability in a value or range. Moreover, no element or component in this disclosure is intended to be dedicated to the public regardless of whether the element or component is explicitly recited in the following claims.

What is claimed is:
1. An image judging system comprising:
a server; and
a mobile terminal that performs communication between the server and the mobile terminal,
the server including
a position calculating unit that calculates a position of an image of interest in a whole image data and a position of a first landmark image in the whole image data, the whole image data being obtained on a basis of a judging target image, the judging target image being provided on a recording medium and including a plurality of landmark images and the image of interest, the first landmark image being one, of the landmark images, corresponding to the image of interest,
the mobile terminal including
an imaging unit that captures an image of the judging target image and thereby generates image data,
the server or the mobile terminal including
a guide information generating unit that detects the first landmark image in the image data, and calculates a position of a guide mark on a basis of a positional relationship and a position of the first landmark image in the image data, the positional relationship being a positional relationship between the image of interest in the whole image data and the first landmark image in the whole image data, the guide mark being to be disposed in the image data and relative to the image of interest,
the mobile terminal including a display unit that displays the image data and the guide mark together,
the imaging unit generating related image data after the display unit displays the guide mark, the related image data being related to the judging target image.

2. The image judging system according to claim 1, wherein the related image data comprises enlarged image data of the judging target image.

3. The image judging system according to claim 1, wherein
the position calculating unit further calculates a size of the image of interest on a basis of the whole image data, and
the guide information generating unit further detects a size of the first landmark image in the image data, and calculates a size of the guide mark on a basis of a size of the first landmark image in the whole image data, the detected size of the first landmark image in the image data, and the size of the image of interest calculated by the position calculating unit.

4. The image judging system according to claim 1, wherein
the position calculating unit further calculates a size of the image of interest in the whole image data and a position of a second landmark image of the landmark images in the whole image data,
the guide information generating unit further detects the second landmark image in the image data, and calculates a size of the guide mark on a basis of a first distance, a second distance, and the size of the image of interest calculated by the position calculating unit, the first distance being a distance from the first landmark image to the second landmark image in the whole image data, the second distance being a distance from the first landmark image to the second landmark image in the image data.

5. The image judging system according to claim 3, wherein the size of the guide mark in the image data corresponds to a size of the image of interest in the image data.

6. The image judging system according to claim 3, wherein
the display unit displays a reference mark in addition to the image data and the guide mark together, the reference mark indicating a position to dispose the guide mark, and
the imaging unit generates the related image data after the position and the size of the guide mark are adjusted on a basis of a position and a size of the reference mark.

7. The image judging system according to claim 3, wherein the imaging unit generates the related image data after the size of the guide mark is adjusted on a basis of a size of a display region of the display unit.

8. The image judging system according to claim 3, wherein the guide information generating unit generates instruction information, the instruction information notifying a user of a method of adjusting the position, the size, or both of the guide mark in the image data.

9. The image judging system according to claim 8, wherein the instruction information including an instruction to adjust a distance from the mobile terminal to the recording medium on which the judging target image is provided.

10. The image judging system according to claim 3, wherein
the mobile terminal includes an operation unit that receives operation of adjusting the position of the guide mark and the size of the guide mark, and
the imaging unit sets an imaging range on a basis of an instruction given from the operation unit.

11. The image judging system according to claim 1, wherein the guide mark has a frame shape that surrounds a portion or all of the image of interest.

12. The image judging system according to claim 1, wherein the first landmark image includes one or more of a character, number, and a symbol.

13. The image judging system according to claim 1, wherein
the judging target image is formed on the recording medium by an image forming apparatus, and
the server includes an image judging unit that performs image judging on a basis of the related image data and thereby generates a setting value of an image formation parameter of the image forming apparatus.

14. An image judging apparatus comprising:
a position calculating unit that calculates a position of an image of interest in a whole image data and a position of a first landmark image in the whole image data, the whole image data being obtained on a basis of a judging target image, the judging target image being provided on a recording medium and including a plurality of landmark images and the image of interest, the first landmark image being one, of the landmark images, corresponding to the image of interest;
an imaging unit that captures an image of the judging target image and thereby generates image data;
a guide information generating unit that detects the first landmark image in the image data, and calculates a position of a guide mark on a basis of a positional relationship and a position of the first landmark image in the image data, the positional relationship being a positional relationship between the image of interest in the whole image data and the first landmark image in the whole image data, the guide mark being to be disposed in the image data and relative to the image of interest; and
a display unit that displays the image data and the guide mark together,
the imaging unit generating related image data after the display unit displays the guide mark, the related image data being related to the judging target image.

15. An image judging method comprising:
calculating a position of an image of interest in a whole image data and a position of a first landmark image in the whole image data, the whole image data being obtained on a basis of a judging target image, the judging target image being provided on a recording medium and including a plurality of landmark images and the image of interest, the first landmark image being one, of the landmark images, corresponding to the image of interest;
capturing an image of the judging target image and thereby generating image data;
detecting the first landmark image in the image data;
calculating a position of a guide mark on a basis of a positional relationship and a position of the first landmark image in the image data, the positional relationship being a positional relationship between the image of interest in the whole image data and the first landmark image in the whole image data, the guide mark being to be disposed in the image data and relative to the image of interest;
displaying the image data and the guide mark together; and
generating related image data after the displaying of the guide mark, the related image data being related to the judging target image.

* * * * *